(12) United States Patent
Ito

(10) Patent No.: US 11,137,633 B2
(45) Date of Patent: Oct. 5, 2021

(54) OPTICAL SUBSTRATE, ELECTRONIC APPARATUS, AND METHOD FOR MANUFACTURING OPTICAL SUBSTRATE

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 6 days.

(21) Appl. No.: 16/790,827

(22) Filed: Feb. 14, 2020

(65) Prior Publication Data
US 2020/0264474 A1    Aug. 20, 2020

(30) Foreign Application Priority Data
Feb. 15, 2019 (JP) .............................. JP2019-025272

(51) Int. Cl.
*G02F 1/1335* (2006.01)

(52) U.S. Cl.
CPC .. *G02F 1/133526* (2013.01); *G02F 1/133512* (2013.01)

(58) Field of Classification Search
None
See application file for complete search history.

(56) References Cited

U.S. PATENT DOCUMENTS

| 2014/0118664 A1* | 5/2014 | Nimura | G02B 3/0043 349/95 |
|---|---|---|---|
| 2015/0002790 A1 | 1/2015 | Ito | |
| 2017/0102583 A1 | 4/2017 | Ito | |

FOREIGN PATENT DOCUMENTS

| JP | H11-024060 A | 1/1999 |
| JP | 2001-201736 A | 7/2001 |
| JP | 2003-329808 A | 11/2003 |
| JP | 2006-039265 A | 2/2006 |
| JP | 2010-204642 A | 9/2010 |
| JP | 2011-081229 A | 4/2011 |
| JP | 2015-011090 A | 1/2015 |

* cited by examiner

*Primary Examiner* — Thanh Nhan P Nguyen
(74) *Attorney, Agent, or Firm* — Oliff PLC

(57) ABSTRACT

An optical substrate according to the present disclosure includes a base having translucency, a translucent layer having translucency, and a lens layer that is disposed between the base and the translucent layer and includes a lens assembly including a plurality of lenses. The lens assembly and the base are disposed with a space therebetween. The lens layer includes a through hole that extends through the lens layer in a thickness direction. The translucent layer is disposed over the through hole.

12 Claims, 16 Drawing Sheets

OPTICAL SUBSTRATE, ELECTRONIC APPARATUS, AND METHOD FOR MANUFACTURING OPTICAL SUBSTRATE

The present application is based on, and claims priority from JP Application Serial Number 2019-025272, filed Feb. 15, 2019, the disclosure of which is hereby incorporated by reference herein in its entirety.

BACKGROUND

1. Technical Field

The present disclosure relates to an optical substrate, an electronic apparatus, and a method for manufacturing an optical substrate.

2. Related Art

In an electro-optical device such as a liquid crystal device, an optical substrate including a plurality of lenses is used to suppress a loss of a light amount. JP-A-2015-11090 discloses a substrate for an electro-optical device including a microlens. The substrate for the electro-optical device includes a substrate including a recessed portion, and a lens layer including the microlens acquired by filling, in the recessed portion, a lens material with a refractive index higher than a refractive index of the substrate. The substrate including the recessed portion is formed of quartz, for example. The lens layer is formed of SiON, for example.

In terms of enhancing lens performance, a difference in refractive index between the substrate and the lens layer may be increased. It is conceivable that, for example, a refractive index of the lens layer is increased in order to further increase a difference in refractive index. However, a transmittance of light generally tends to decrease with a greater refractive index of the lens layer. Thus, in a known configuration in which the substrate and the lens layer are in contact, when a refractive index of the lens layer is increased, a transmittance of light in the lens layer decreases. Therefore, there is a problem in that it is difficult to improve lens performance while suppressing a decrease in transmittance of light.

SUMMARY

An aspect of an optical substrate according to the present disclosure includes a base having translucency, a translucent layer having translucency, and a lens layer that is disposed between the base and the translucent layer and includes a lens assembly including a plurality of lenses, where the lens assembly and the base are disposed with a space therebetween, the space is provided therebetween, the lens layer includes a through hole that extends through the lens layer in a thickness direction, and the translucent layer is disposed over and to fill the through hole.

An aspect of a method for manufacturing an optical substrate according to the present disclosure includes forming a base having translucency, forming, on the base, a lens layer including a lens assembly including a plurality of lenses, and forming, on the lens layer, a translucent layer having translucency, where a through hole that extends through the lens layer in a thickness direction is formed during the formation of the lens layer, a space is formed between the lens assembly and the base by etching by using the through hole after the formation of the lens layer and before the formation of the translucent layer, and the through hole is covered and is filled by the translucent layer during the formation of the translucent layer.

DESCRIPTION OF EXEMPLARY EMBODIMENTS

Figure 1:
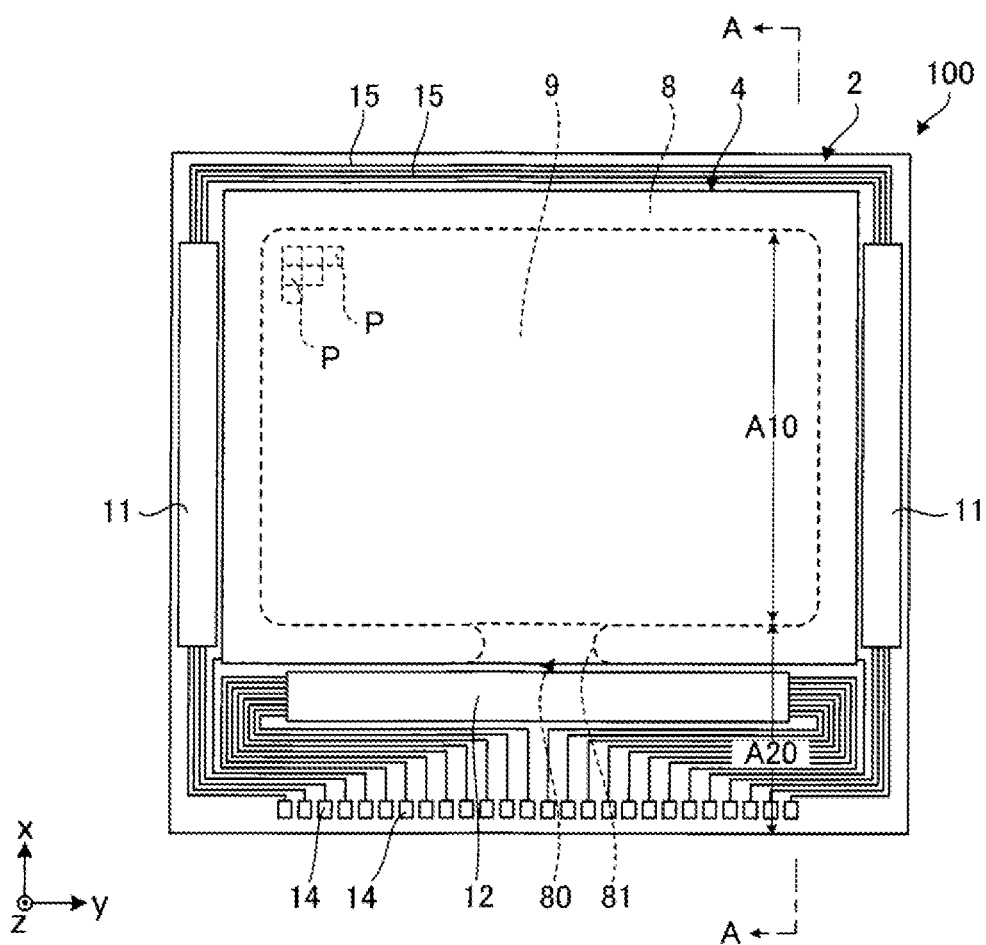
FIG. 1 is a plan view of an electro-optical device according to a first exemplary embodiment.

Preferred exemplary embodiments of the present disclosure will be described below with reference to the accompanying drawings. Note that, in the drawings, dimensions and scales of sections are differed from actual dimensions and scales as appropriate, and some of the sections are schematically illustrated to make them easily recognizable. Further, the scope of the present disclosure is not limited to these exemplary embodiments unless otherwise stated to limit the present disclosure in the following descriptions.

1. Electro-Optical Device

1-1. First Exemplary Embodiment

As an example of an electro-optical device of the present disclosure, an active matrix liquid crystal display device will be described as an example.

1-1a. Basic Configuration

Figure 2:
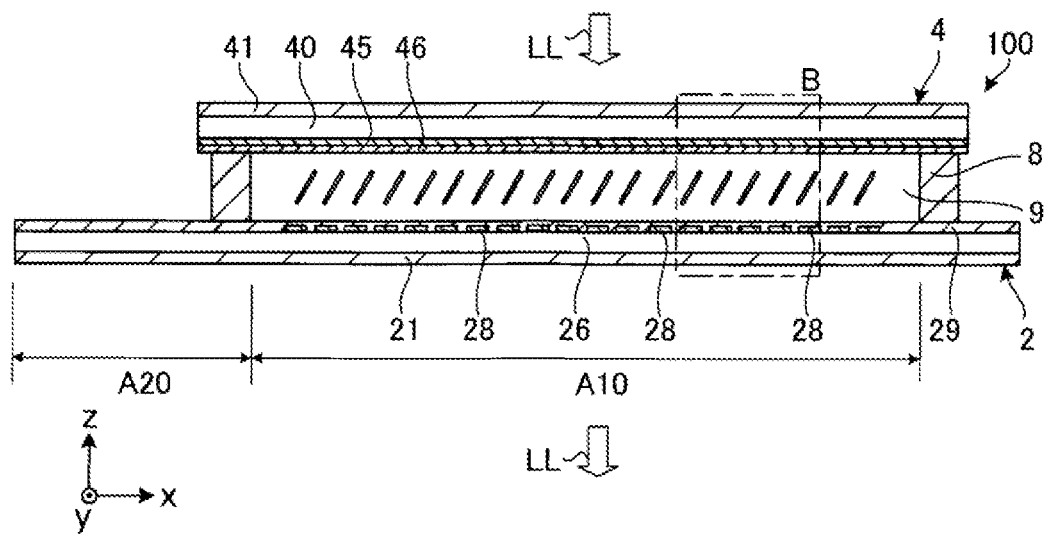
FIG. 2 is a cross-sectional view of the electro-optical device according to the first exemplary embodiment.

FIG. 1 is a schematic plan view of an electro-optical device 100 according to a first exemplary embodiment. FIG. 2 is a schematic cross-sectional view of the electro-optical device 100 according to the first exemplary embodiment, and is a cross-sectional view of the electro-optical device 100 taken along an A-A line in FIG. 1. Note that, for convenience of explanation, the description will be made appropriately using an x-axis, a y-axis, and a z-axis orthogonal to each other illustrated in each of FIGS. 1 and 2.

The electro-optical device 100 illustrated in FIGS. 1 and 2 serves as a transmissive-type liquid crystal display device. As illustrated in FIG. 2, the electro-optical device 100 includes an element substrate 2 having translucency, a counter substrate 4 serving as an "optical substrate" having translucency, a sealing member 8 having a frame shape, and a liquid crystal layer 9. The sealing member 8 is disposed between the element substrate 2 and the counter substrate 4. The liquid crystal layer 9 is disposed in a region surrounded by the element substrate 2, the counter substrate 4, and the sealing member 8. Here, an alignment direction of the element substrate 2, the liquid crystal layer 9, and the counter substrate 4 is a z direction, and a surface of the counter substrate 4 is parallel to an x-y plane. Further, viewing from the z direction parallel to a thickness direction of a lens layer 42, which will be described later, included in the counter substrate 4 is referred to as "plan view".

In the present exemplary embodiment, a case in which light LL is incident on the electro-optical device 100 from the counter substrate 4, is transmitted through the liquid crystal layer 9, and is emitted from the element substrate 2 will be described as an example. Note that, in the specification, incident light being incident on the electro-optical device 100, light being transmitted through the electro-optical device 100, and emission light being emitted from the electro-optical device 100 are all described as the light LL without any distinction. Further, in the specification, "translucency" refers to transparency to visible light, and means that a transmittance of visible light may be greater than or equal to 50%. As illustrated in FIG. 1, the electro-optical device 100 has a rectangular shape in plan view, but a planar shape of the electro-optical device 100 is not limited to the rectangular shape and may be a round shape and the like, for example.

As illustrated in FIG. 1, the element substrate 2 has a size encompassing the counter substrate 4 in plan view. As illustrated in FIG. 2, the element substrate 2 includes a first base 21, a wiring layer 26, a plurality of pixel electrodes 28, and a first alignment film 29. The first base 21, the wiring layer 26, the plurality of pixel electrodes 28, and the first alignment film 29 are arranged in this order. The first alignment film 29 is located closest to the liquid crystal layer 9. The first base 21 is formed of a flat plate having translucency and insulating properties. The first base 21 is formed of glass or quartz, for example. The pixel electrode 28 has translucency, and is formed of a transparent conductive material such as indium tin oxide (ITO) or indium zinc oxide (IZO), for example. The first alignment film 29 aligns liquid crystal molecules of the liquid crystal layer 9. Examples of the constituent material of the first alignment film 29 include polyimide and silicon oxide, for example. Note that a specific configuration of the wiring layer 26 will be described later.

As illustrated in FIG. 2, the counter substrate 4 includes a second base 41 as a "base", a light guide layer 40, a counter electrode 45, and a second alignment film 46. The second base 41, the light guide layer 40, the counter electrode 45, and the second alignment film 46 are arranged in this order. The second alignment film 46 is located closest to the liquid crystal layer 9. The second base 41 is formed of a flat plate having translucency and insulating properties. The second base 41 is formed of glass, quartz, or the like, for example. The counter electrode 45 is formed of a transparent conductive material such as ITO or IZO, for example. The second alignment film 46 aligns the liquid crystal molecules of the liquid crystal layer 9.

Examples of the constituent material of the second alignment film 46 include polyimide and silicon oxide, for example. Note that a specific configuration of the counter substrate 4 will be described later.

The sealing member 8 is formed by using an adhesive containing various types of curable resins such as epoxy resin, for example. The sealing member 8 is fixed to each of the element substrate 2 and the counter substrate 4. An injection port 81 for injecting a liquid crystal material containing liquid crystal molecules is formed in a part of the sealing member 8, and the injection port 81 is sealed by a sealing material 80 formed by using various resin materials.

The liquid crystal layer 9 contains the liquid crystal molecules having positive or negative dielectric anisotropy. The liquid crystal layer 9 is interposed between the element substrate 2 and the counter substrate 4 such that the liquid crystal molecules are in contact with both the first alignment film 29 and the second alignment film 46. The alignment of the liquid crystal molecules included in the liquid crystal layer 9 varies in accordance with a voltage applied to the liquid crystal layer 9. The liquid crystal layer 9 can achieve grayscale display by modulating the light LL in accordance with the applied voltage.

Further, as illustrated in FIG. 1, a plurality of scanning line driving circuits 11, a signal line driving circuit 12, and a plurality of external terminals 14 are disposed on the surface of the element substrate 2 on the counter substrate 4 side. A routing wire 15 being routed from each of the scanning line driving circuit 11 and the signal line driving circuit 12 is coupled to the external terminal 14.

The electro-optical device 100 having such a configuration includes a display region A10 in which an image and the like are displayed and a peripheral region A20 surrounding the display region A10 in plan view. The display region 10A includes a plurality of pixels P arranged in a matrix pattern. The scanning line driving circuit 11, the signal line driving circuit 12, and the like are disposed in the peripheral region A20.

1-1b. Electrical Configuration

Figure 3:
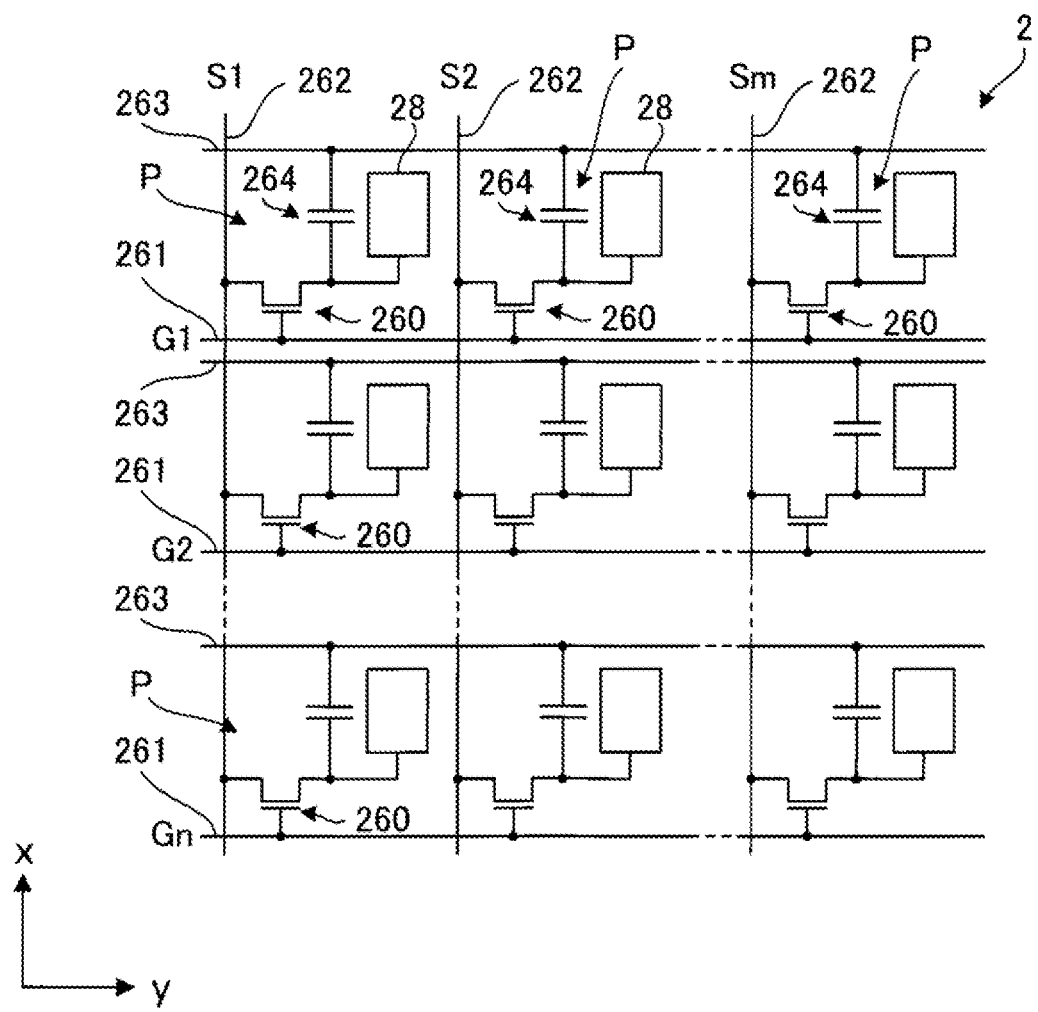
FIG. 3 is an equivalent circuit diagram illustrating an electrical configuration of an element substrate according to the first exemplary embodiment.

FIG. 3 is an equivalent circuit diagram illustrating an electrical configuration of the element substrate 2 according to the first exemplary embodiment. As illustrated in FIG. 3, n pieces of scanning lines 261, m pieces of signal lines 262, and n pieces of capacitor lines 263 are provided on the element substrate 2. Each of n and m is an integer of 2 or greater. A TFT 260 serving as a switching element is disposed corresponding to each of the intersections between the n pieces of scanning lines 261 and the m pieces of signal lines 262.

The n pieces of scanning lines 261 each extend in the y direction and are arranged at regular intervals in the x direction. The scanning line 261 is electrically coupled to a gate of the TFT 260. The n pieces of scanning lines 261 are electrically coupled to the scanning line driving circuit 11 illustrated in FIG. 1. Scanning signals G1, G2, . . . , and Gn are line-sequentially supplied to the n pieces of scanning lines 261 from the scanning line driving circuit 11.

The m pieces of signal lines 262 illustrated in FIG. 3 each extend in the x direction and are arranged at regular intervals in the y direction. The signal line 262 is electrically coupled to a source of the TFT 260. The m pieces of signal lines 262 are electrically coupled to the signal line driving circuit 12 illustrated in FIG. 1. Image signals S1, S2, . . . , and Sm are supplied to the m pieces of signal lines 262 in parallel from the signal line driving circuit 12 illustrated in FIG. 1.

The n pieces of scanning lines 261 and the m pieces of signal lines 262 illustrated in FIG. 3 are insulated from each other and are formed in a lattice-like pattern in plan view. A region surrounded by two adjacent scanning lines 261 and two adjacent signal lines 262 corresponds to the pixel P. In one pixel P, one pixel electrode 28 is formed. The pixel electrode 28 is electrically coupled to the TFT 260.

The n pieces of capacitor lines 263 each extend in the y direction and are arranged at regular intervals in the x direction. The n pieces of capacitor lines 263 are insulated from the plurality of signal lines 262 and the plurality of scanning lines 261, and are formed apart from these lines. A fixed potential such as a ground potential is applied to the capacitor lines 263. A storage capacitor 264 is provided in parallel to a liquid crystal capacitor, between the capacitor line 263 and the pixel electrode 28, to prevent leakage of charges held in the liquid crystal capacitor.

The scanning signals G1, G2, . . . , and Gn sequentially become active and the n pieces of scanning lines 261 are sequentially selected, then the TFT 260 coupled to the selected scanning line 261 is brought into an on-state. Then, the image signals S1, S2, . . . , and Sm having magnitudes commensurate with the grayscale to be displayed are transmitted, via the m pieces of signal lines 262, to the pixel P corresponding to the selected scanning line 261, and are then applied to the pixel electrodes 28. In this way, a voltage in accordance with the grayscale to be displayed is applied to the liquid crystal capacitor formed between the pixel electrode 28 and the counter electrode 45 included in the counter substrate 4 illustrated in FIG. 2, and the alignment of the liquid crystal molecules then varies in accordance with the applied voltage. The applied voltage is held by the storage capacitor 264. Such a variation in the alignment of the liquid crystal molecules causes the light LL to be modulated, to thus enable grayscale display.

1-1c. Specific Configuration of Electro-Optical Device 100

Figure 4:
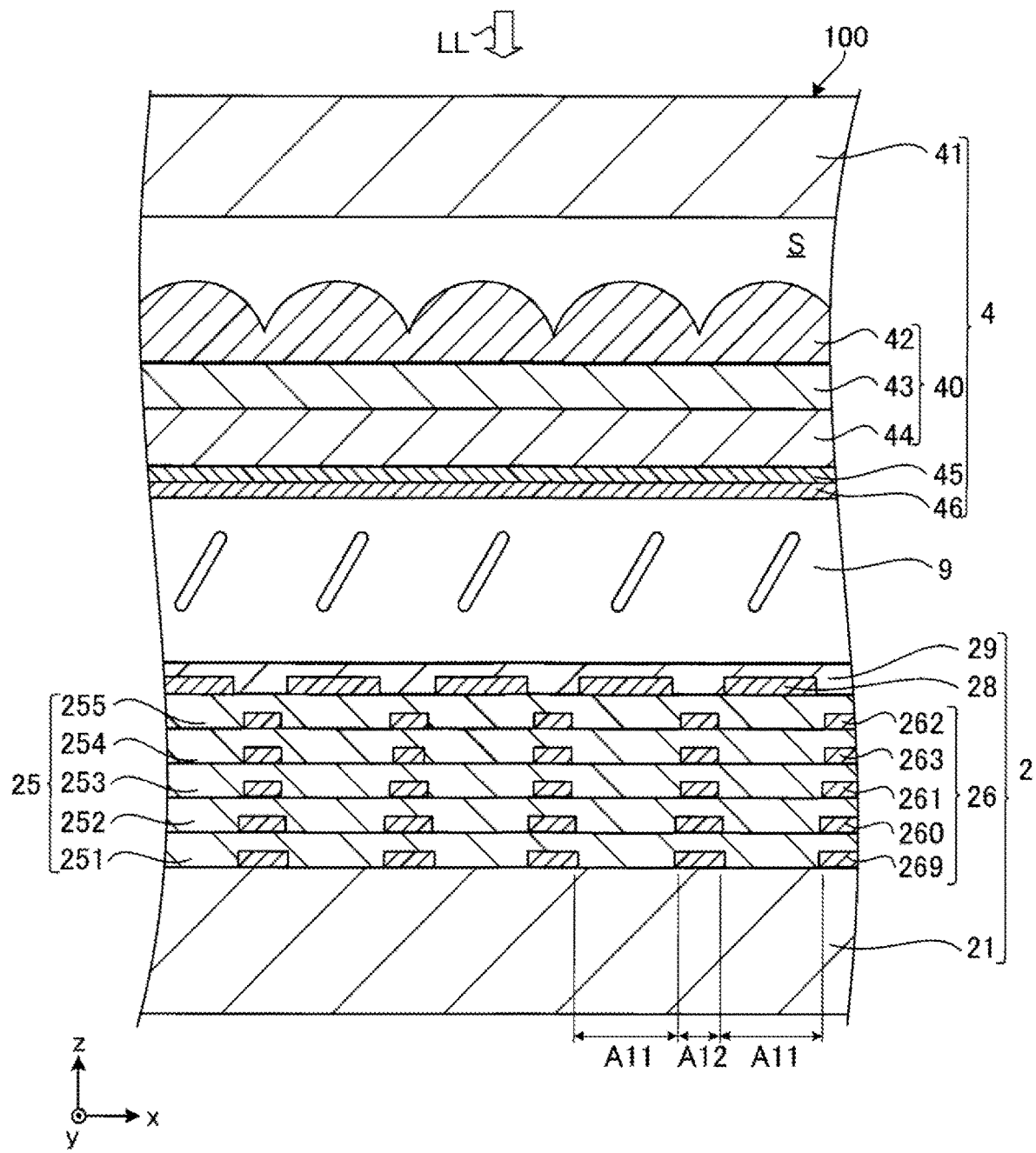
FIG. 4 is a partially enlarged view of the electro-optical device according to the first exemplary embodiment.

FIG. 4 is a partially enlarged view of the electro-optical device 100 according to the first exemplary embodiment, and is a partially enlarged view of a region B in FIG. 2.

1-1cA. Configuration of Element Substrate 2

The element substrate 2 includes the first base 21, the wiring layer 26, the pixel electrode 28, and the first alignment film 29. The wiring layer 26 includes a light shielding layer 269, the TFT 260, the scanning line 261, the capacitor line 263, the signal line 262, and an insulator 25. Note that the order of the TFT 260, the scanning line 261, the capacitor line 263, and the signal line 262 illustrated in FIG. 4 is an example, and the order thereof is not limited to the illustrated example. Further, as described above, the signal line 262 extends in the x direction, but, in FIG. 4, the arrangement of the signal lines 262 differs from the actual arrangement to facilitate understanding. In FIG. 4, various wiring lines other than the TFT 260, the scanning line 261, the capacitor line 263, and the signal line 262 are omitted.

The insulator 25 has translucency and insulating properties. The insulator 25 includes a first interlayer insulating film 251, a second interlayer insulating film 252, a third interlayer insulating film 253, a fourth interlayer insulating film 254, and a fifth interlayer insulating film 255. The first interlayer insulating film 251 is disposed on the first base 21, and is located between the light shielding layer 269 having light shielding properties and the TFT 260. The second interlayer insulating film 252 is disposed on the first interlayer insulating film 251, and is located between the TFT 260 and the scanning line 261. The third interlayer insulating film 253 is disposed on the second interlayer insulating film 252, and is located between the scanning line 261 and the capacitor line 263. The fourth interlayer insulating film 254 is disposed on the third interlayer insulating film 253, and is disposed between the capacitor line 263 and the signal line 262. The fifth interlayer insulating film 255 is disposed on the fourth interlayer insulating film 254, and covers the signal line 262.

Various wiring lines such as the TFT 260, the scanning line 261, the capacitor line 263, and the signal line 262, and the light shielding layer 269 are each formed of a metal, a metal compound, or the like, for example. Further, each layer included in the insulator 25 is formed of a silicon-based inorganic material such as silicon oxide, for example. Although not illustrated in the drawings, a layer formed of a silicon-based inorganic material having, for example, translucency and insulating properties may be disposed between the first base 21 and the insulator 25.

The wiring layer 26 includes a plurality of light transmission regions A11 through which the light LL is transmitted, and a wiring region A12 in which various wiring lines are disposed. The light transmission region A11 has a substantially rectangular shape in plan view. The plurality of light transmission regions A11 are arranged in a matrix pattern in plan view. Further, the wiring region A12 fills the light LL. The wiring region A12 has a lattice-like pattern in plan view. The wiring region A12 surrounds the light transmission region A11 in plan view.

The plurality of pixel electrodes 28 are disposed on the wiring layer 26. One pixel electrode 28 and one light transmission region A11 overlap each other in plan view. One pixel electrode 28 and one light transmission region A11 are provided for one pixel P.

Note that the element substrate 2 does not include an optical member that converges or diverges the light LL, but may also include the optical member.

1-1cB. Configuration of Counter Substrate 4

Figure 5:
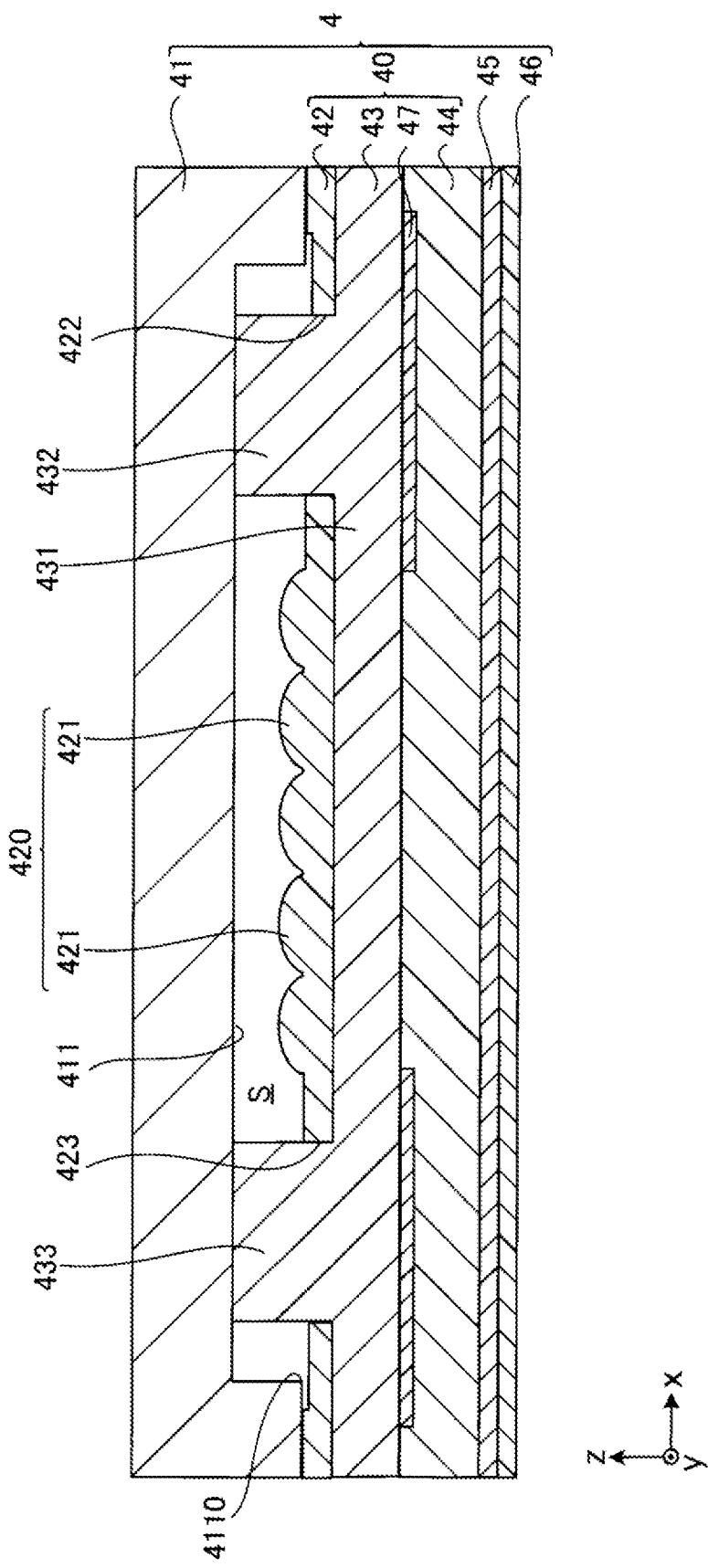
FIG. 5 is a cross-sectional view of a counter substrate according to the first exemplary embodiment.
Figure 6:
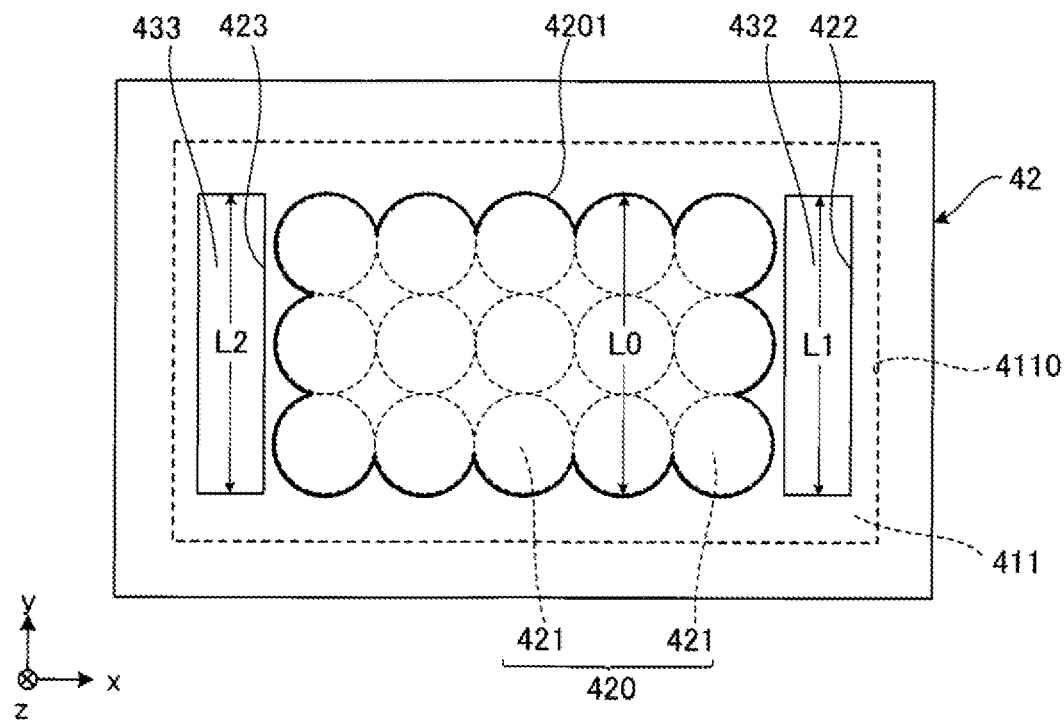
FIG. 6 is a diagram illustrating a lens layer included in a light guide layer according to the first exemplary embodiment.
Figure 7:
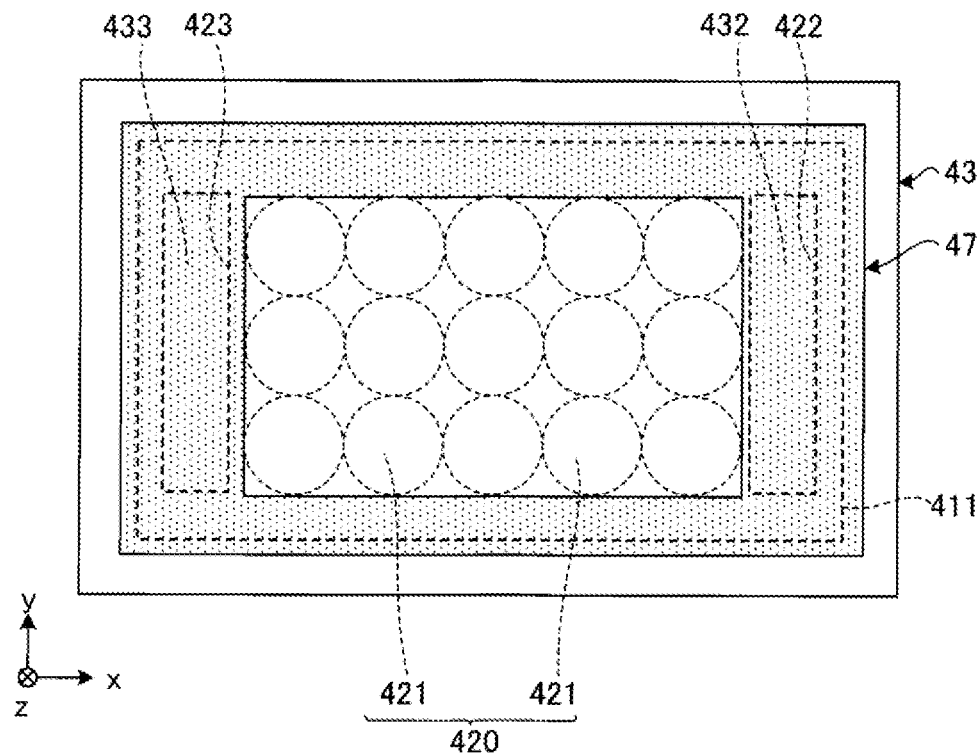
FIG. 7 is a diagram illustrating a light shielding film included in the light guide layer according to the first exemplary embodiment.

The counter substrate 4 includes the second base 41, the light guide layer 40, the counter electrode 45, and the second alignment film 46. FIG. 5 is a cross-sectional view of the counter substrate 4 according to the first exemplary embodiment. FIG. 6 is a diagram illustrating the lens layer 42 included in the light guide layer 40 according to the first exemplary embodiment. FIG. 7 is a diagram illustrating a light shielding film 47 included in the light guide layer 40 according to the first exemplary embodiment. Note that the number of lenses 421 illustrated in FIGS. 5 and 6 differs from that in the counter substrate 4 in FIG. 2 for convenience of explanation.

As illustrated in FIG. 5, the second base 41 includes a recessed portion 411. The recessed portion 411 is a recess formed in a surface of the second base 41 on the −z side. The recessed portion 411 has a rectangular shape in plan view.

The light guide layer 40 is disposed on the second base 41. The light guide layer 40 includes the lens layer 42, a first translucent layer 43 as a "translucent layer", the light shielding film 47, and a second translucent layer 44. The counter electrode 45 is disposed on the second translucent layer 44.

The lens layer 42 is disposed on the second base 41. The lens layer 42 includes a lens assembly 420 including the plurality of lenses 421. The lens 421 is formed of a convex lens that protrudes toward the second base 41 side and has a convex curved surface. The lens 421 is hemispherical. The plurality of lenses 421 are disposed in close contact with each other. The lens assembly 420 is spaced apart from a bottom surface of the recessed portion 411. Thus, a space S is formed between the lens assembly 420 and the second base 41. Note that a portion of the lens layer 42 outside the lens assembly 420 in plan view is in contact with the second base 41.

As illustrated in FIG. 6, the lens assembly 420 is encompassed in the recessed portion 411 in plan view. In other words, the lens assembly 420 overlaps the recessed portion 411 in plan view, and an outer shape 4201 of the lens assembly 420 in plan view is smaller than an opening edge 4110 of the recessed portion 411. In FIG. 6, the outer shape 4201 is indicated by a thick line to facilitate understanding. Further, the plurality of lenses 421 are arranged in a matrix pattern in the x direction and the y direction in plan view. Note that the arrangement of the plurality of lenses 421 is not limited to the matrix pattern. Further, the number of lenses 421 may be the plurality of lenses 421, and is not limited to the illustrated number.

Further, the lens layer 42 includes a first hole 422 as a "through hole" and a second hole 423 as a "second through hole". The lens assembly 420 is located between the first hole 422 and the second hole 423 in plan view. The first hole 422 and the second hole 423 are each spaced apart from the lens assembly 420 in plan view. Further, the first hole 422 and the second hole 423 each overlap the recessed portion 411 in plan view. As illustrated in the drawing, a length L1 along the y direction of the first hole 422 and a length L2 along the y direction of the second hole 423 are each substantially equal to a length L0 along the y direction of the lens assembly 420. Note that the length L1 and the length L2 may be longer than or shorter than the length L0. Further, the length L1 and the length L2 are substantially equal, but may be different from each other. Further, a width of the first hole 422 and a width of the second hole 423 are substantially equal, but may be different from each other. The width is a length along the x direction.

As illustrated in FIG. 5, the first translucent layer 43 is disposed on the lens layer 42. The first translucent layer 43 has translucency and insulating properties. The first translucent layer 43 includes a translucent base portion 431 having a flat plate shape, a first connection portion 432, and a second connection portion 433. The first connection portion 432 is an example of a "connection portion". The translucent base portion 431 is disposed on a surface of the lens layer 42 on the −z axis side. In other words, the lens layer 42 is disposed between the translucent base portion 431 and the second base 41.

The first connection portion 432 extends from a portion of the translucent base portion 431 on the +z axis side toward the second base 41 side, and is in contact with the bottom surface of the recessed portion 411 through the first hole 422. Similarly, the second connection portion 433 extends from a portion of the translucent base portion 431 on the +z axis side toward the second base 41 side, and is in contact with the bottom surface of the recessed portion 411 through the second hole 423. As illustrated in FIG. 6, the lens assembly 420 is located between the first connection portion 432 and the second connection portion 433 in plan view. The first connection portion 432 fills in the first hole 422. Similarly, the second connection portion 433 fills in the second hole 423.

The first translucent layer 43 fills the first hole 422 and the second hole 423. Thus, the space S described above is an airtight space. The space S is constituted by a gas such as air, or a vacuum. Note that the space S may not be an airtight space.

As illustrated in FIG. 5, the second translucent layer 44 having a flat plate shape is disposed on the first translucent layer 43. The second translucent layer 44 has translucency and insulating properties. The second translucent layer 44 adjusts an optical path length of the light LL being transmitted through the lens 421. A shape of the second translucent layer 44 in plan view corresponds to a shape of the translucent base portion 431 in plan view. Specifically, the second translucent layer 44 has a rectangular shape in plan view.

Further, the lens layer 42, the first translucent layer 43, and the second translucent layer 44, which are described above, may be each formed of a material having translucency, and, specifically, may be each formed of a silicon-based inorganic material such as silicon oxide and silicon oxynitride. The use of such an inorganic material makes it easier to form the lens layer 42 that has excellent optical properties and is also sufficiently thin as compared with when a resin material is used. Note that the same also applies to the first translucent layer 43 and the second translucent layer 44.

Further, among the silicon-based inorganic materials, each of the lens layer 42, the first translucent layer 43, and the second translucent layer 44 may be mainly formed of silicon oxide. By using silicon oxide, the translucency can be increased further than that when silicon nitride is used, for example. Further, by mainly forming the second translucent layer 44 of silicon oxide, it is possible to suppress absorption of a material and the like contained in a layer other than the second translucent layer 44 by the second translucent layer 44 during manufacturing as compared with when the second translucent layer 44 is mainly formed of silicon nitride. Thus, a decrease in film quality of the second translucent layer 44 can be suppressed. Note that the same also applies to the first translucent layer 43 and the second translucent layer 44. Further, by mainly forming the lens layer 42 of silicon nitride, the lens performance can be increased as compared with when the lens layer 42 is mainly formed of silicon oxide. Further, the lens layer 42, the first translucent layer 43, and the second translucent layer 44 may be each formed of a resin material.

Further, the lens layer 42, the first translucent layer 43, and the second translucent layer 44 may be formed of materials different from each other, but may be formed of the same material. Interfacial reflection and the like can be suppressed by forming them of the same material as compared with when they are formed of materials different from each other.

The light shielding film 47 having light shielding properties is disposed between the first translucent layer 43 and the second translucent layer 44. The "light shielding properties" refer to light blocking properties to visible light, and specifically means that a transmittance of visible light is less than or equal to 10% and may be less than or equal to 5%. The light shielding film 47 is formed of a metal or a metal compound, for example. As illustrated in FIG. 7, the light shielding film 47 has a rectangular frame shape in plan view. Note that, in FIG. 7, dots are drawn on the light shielding film 47 to facilitate understanding. The light shielding film 47 surrounds the lens assembly 420 in plan view. Further, the light shielding film 47 overlaps the first hole 422 and the second hole 423 in plan view. Thus, the light shielding film 47 overlaps the first connection portion 432 and the second connection portion 433 in plan view. Note that a shape of the light shielding film 47 in plan view is not limited to the illustrated rectangular frame shape.

As described above, the counter substrate 4 includes the second base 41 having translucency, the first translucent layer 43 having translucency, and the lens layer 42 that is disposed between the second base 41 and the first translucent layer 43 and includes the lens assembly 420 including the plurality of lenses 421. Then, the space S is provided between the lens assembly 420 and the second base 41. By providing the space S, as compared with when the lens assembly 420 is in contact with the second base 41, the lens performance can be increased while suppressing a decrease in transmittance of the light LL in the lens layer 42. The reason is that a difference in refractive index between the lens layer 42 and the space S is greater than a difference in refractive index between the lens layer 42 and the second base 41. Further, since the space S is provided, a refractive index difference between the lens 421 and the space S can be sufficiently increased without increasing a refractive index of the lens layer 42 as in the related art. Thus, a decrease in translucency of the lens layer 42 can be prevented by increasing a refractive index of the lens layer 42.

As described above, the lens layer 42 is provided with the first hole 422 that penetrates in the thickness direction, and the second hole 423 that penetrates in the thickness direction. Then, the first translucent layer 43 fills the first hole 422 and the second hole 423. By providing the first translucent layer 43 that fills the first hole 422 and the second hole 423, the counter substrate 4 having excellent lens performance can be manufactured with ease and high precision as compared with when the first translucent layer 43 is not provided. Note that a specific method for manufacturing the counter substrate 4 will be described below in detail. Note that the arrangement of the first hole 422 is not limited to the illustrated example, and any arrangement can be used. The same also applies to the second hole 423. Further, the lens layer 42 may include at least the first hole 422, and the second hole 423 may be omitted.

As described above, the first translucent layer 43 includes the first connection portion 432 coupled to the second base 41 through the first hole 422, and the second connection portion 433 coupled to the second base 41 through the second hole 423. By providing the first connection portion 432, the first hole 422 can be suitably filled as comparison with when the first connection portion 432 is not provided. Similarly, by providing the second connection portion 433, the second hole 423 can be suitably filled as compared with when the second connection portion 433 is not provided. Thus, by providing the first connection portion 432 and the second connection portion 433, a state in the space S is more easily maintained than when the first connection portion 432 and the second connection portion 433 are not provided. Note that the first translucent layer 43 may be formed of only the translucent base portion 431. In other words, the first translucent layer 43 may not include the first connection portion 432 and the second connection portion 433.

As described above, the counter substrate 4 further includes the light shielding film 47 that does not overlap the lens assembly 420 in plan view when viewed from the thickness direction of the lens layer 42. The light shielding film 47 fills the light LL that is not transmitted through the lens assembly 420. Stray light of the light LL can be suppressed by providing the light shielding film 47. Note that, in the present exemplary embodiment, the light shielding film 47 does not overlap the lens assembly 420 in plan view, but a part of the light shielding film 47 may overlap with the lens assembly 420 in plan view.

As described above, the counter electrode 45 that is disposed on an opposite side from the lens layer 42 with respect to the first translucent layer 43 and serves as an "electrode" having translucency, and the second translucent layer 44 that is disposed between the counter electrode 45 and the first translucent layer 43 and has translucency are further provided. As described above, the second translucent layer 44 adjusts an optical path length of the light LL being transmitted through the lens 421. Thus, by providing the second translucent layer 44, a condensation position of the light LL being transmitted through the lens layer 42 can be set to a desired position. Specifically, by adjusting a thickness of the second translucent layer 44, a condensation position of the light LL by the lens 421 can be adjusted to a desired position. Note that an optical path length of the light LL may be adjusted by adjusting a refractive index of the second translucent layer 44. Further, by adjusting a thickness of the second translucent layer 44 and a thickness of the translucent base portion 431, an optical path length of the light LL may be adjusted. Further, the second translucent layer 44 may be omitted. In that case, by adjusting a thickness of the light transmission base portion 431, an optical path length of the light LL may be adjusted.

As described above, in the present exemplary embodiment, the light LL is transmitted from the second base 41 toward the counter electrode 45. In other words, the convex lens surface of the lens 421 functions as an incident surface for causing the light LL to be incident on the lens 421 from the space S. Here, as described above, a difference in refractive index between the lens layer 42 and the space S is greater than a difference in refractive index between the lens layer 42 and the second base 41. Thus, by causing the light LL to be incident on the lens 421 from the space S, the light LL can be refracted more greatly such that the light LL converges at the convex lens surface of the lens 421. Therefore, the incidence on the TFT 260 can be reduced, and thus the light utilization efficiency can be improved. Further, a temperature of the electro-optical device 100 can be reduced.

1-1d. Method for Manufacturing Counter Substrate 4

Figure 8:
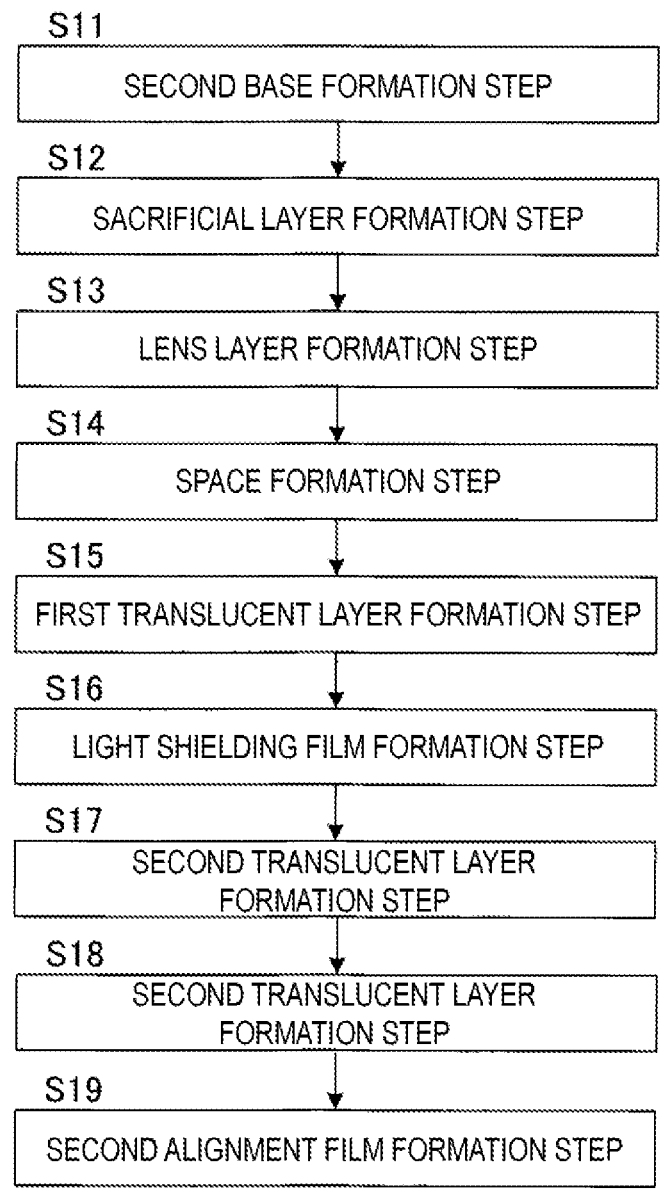
FIG. 8 is a flow illustrating a method for manufacturing the counter substrate according to the first exemplary embodiment.

FIG. 8 is a flow illustrating a method for manufacturing the counter substrate 4 according to the first exemplary embodiment. As illustrated in FIG. 8, the method for manufacturing the counter substrate 4 includes a second base formation step S11, a sacrificial layer formation step S12, a lens layer formation step S13, a space formation step S14, a first translucent layer formation step S15, a light shielding film formation step S16, a second translucent layer formation step S17, a counter electrode formation step S18, and a second alignment film formation step S19.

Figure 9:
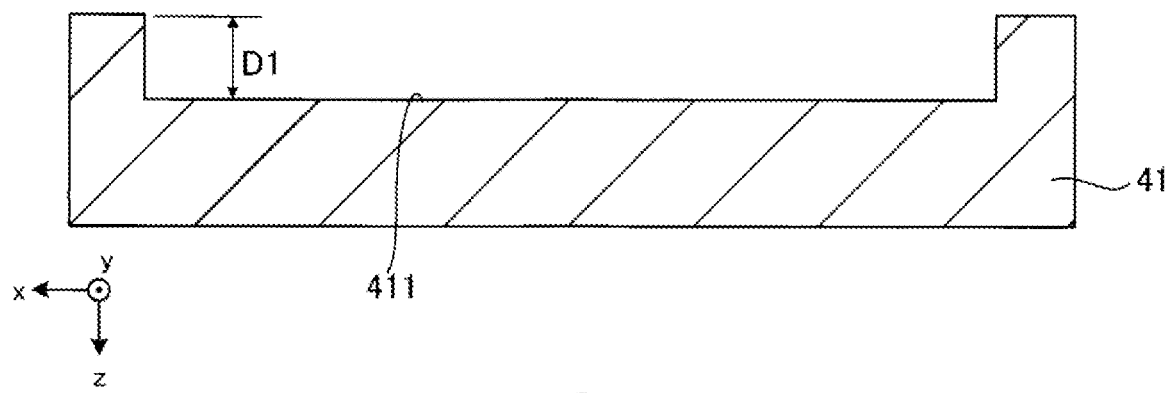
FIG. 9 is a cross-sectional view illustrating a second base formation step according to the first exemplary embodiment.
Figure 10:
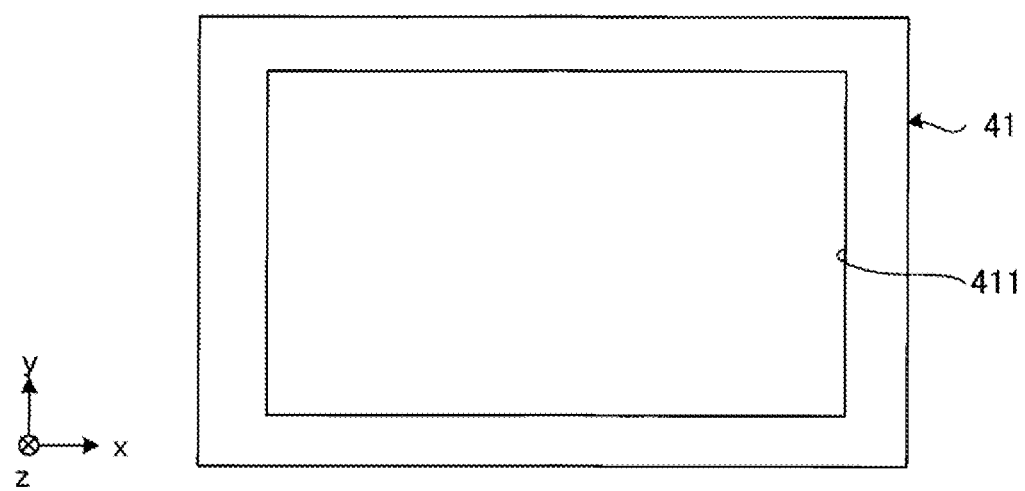
FIG. 10 is a plan view illustrating the second base formation step according to the first exemplary embodiment.
Figure 11:
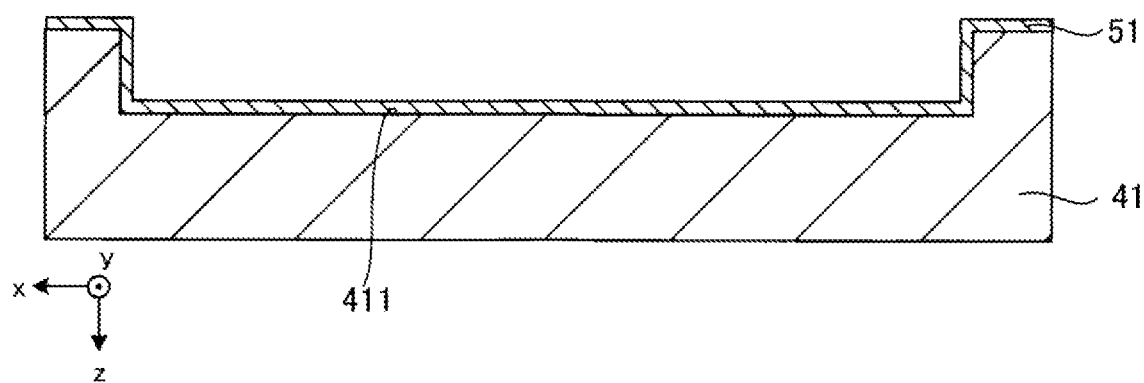
FIG. 11 is a cross-sectional view illustrating a sacrificial layer formation step according to the first exemplary embodiment.

FIG. 9 is a cross-sectional view illustrating the second base formation step S11 according to the first exemplary embodiment. In the second base formation step S11, the second base 41 illustrated in FIG. 9 is formed by forming the recessed portion 411 in a quartz substrate, for example. The formation of the recessed portion 411 is performed by etching, for example. Further, the recessed portion 411 is formed such that a depth D1 of the recessed portion 411 is greater than a thickness D2 of the lens 421 illustrated in FIG. 15, which will be described later. FIG. 11 is a plan view illustrating the second base formation step according to the first exemplary embodiment. As illustrated in FIG. 11, the recessed portion 411 in the second base 41 is formed in a rectangular shape in plan view, for example. Note that a shape of the recessed portion 411 in plan view is not limited to the illustrated shape.

Figure 12:
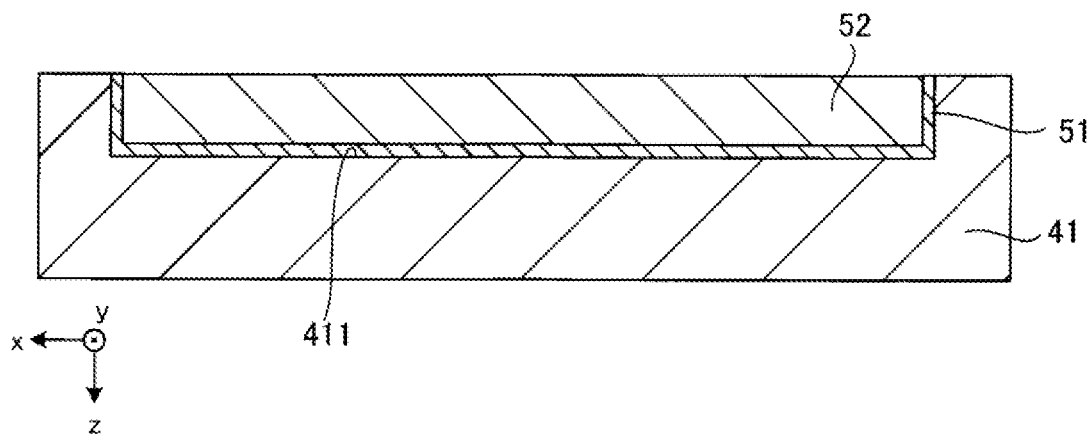
FIG. 12 is a cross-sectional view illustrating the sacrificial layer formation step according to the first exemplary embodiment.
Figure 13:
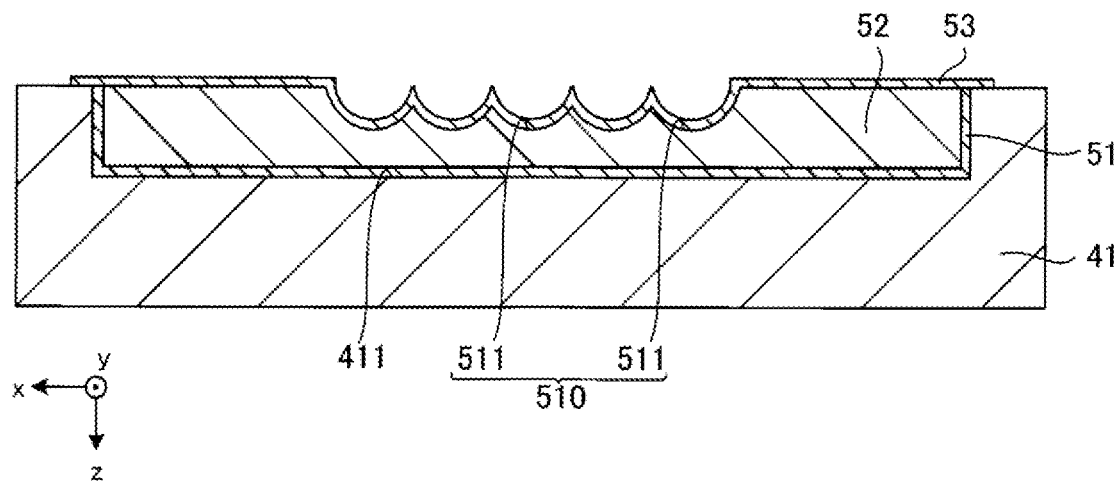
FIG. 13 is a cross-sectional view illustrating the sacrificial layer formation step according to the first exemplary embodiment.
Figure 14:
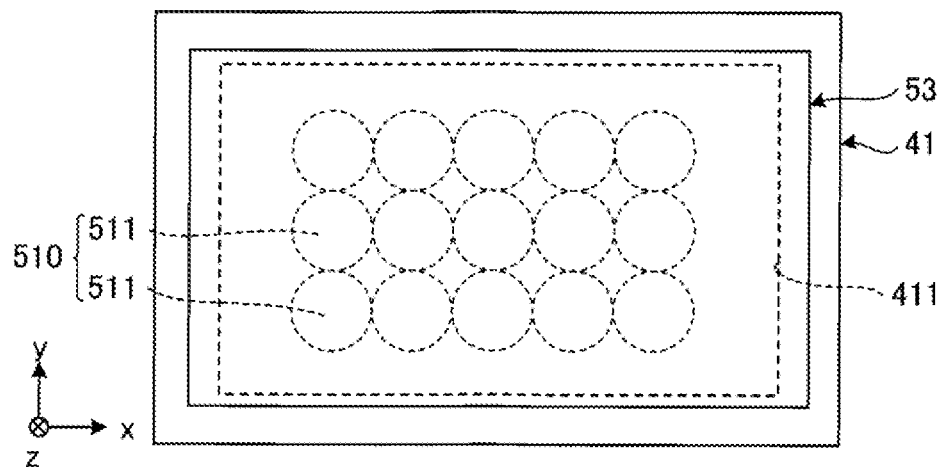
FIG. 14 is a plan view illustrating the sacrificial layer formation step according to the first exemplary embodiment.

FIGS. 11 to 13 are each a cross-sectional view illustrating the sacrificial layer formation step S12 according to the first exemplary embodiment. FIG. 14 is a plan view illustrating the sacrificial layer formation step S12 according to the first exemplary embodiment. In the sacrificial layer formation step S12, first, as illustrated in FIG. 11, a first sacrificial layer 51 is formed on the second base 41. The first sacrificial layer 51 is formed so as to cover a surface of the second base 41 on the −z axis side where the recessed portion 411 is formed. The first sacrificial layer 51 is formed by a vapor deposition method such as a chemical vapor deposition (CVD) method, for example. The first sacrificial layer 51 contains silicon, for example.

Next, as illustrated in FIG. 12, a second sacrificial layer 52 is formed on the first sacrificial layer 51, and then planarization processing is performed on a surface of each of the first sacrificial layer 51 and the second sacrificial layer 52 on the −z axis side. The second sacrificial layer 52 is formed by a vapor deposition method such as a CVD method, for example. Examples of the planarization processing include polishing processing such as a chemical mechanical polishing (CMP) method, for example. The second sacrificial layer 52 contains silicon oxide, for example. The second sacrificial layer 52 may be formed of a material different from that of the first sacrificial layer 51.

Next, as illustrated in FIG. 13, a recessed lens group 510 is formed on the surface of the second sacrificial layer 52 on the −z axis side, and a third sacrificial layer 53 is then formed on the second sacrificial layer 52. The recessed lens group 510 includes a plurality of lens recessed portions 511. The lens recessed portion 511 is a recess formed in the second sacrificial layer 52 to form the lens 421. The lens recessed portion 511 is hemispherical. As illustrated in FIG. 14, the plurality of lens recessed portions 511 are arranged in a matrix pattern in the x direction and the y direction in plan view. Further, the plurality of lens recessed portions 511 overlap the recessed portion 411 in plan view. The formation of the plurality of lens recessed portions 511 is performed by etching, for example. As illustrated in FIG. 13, the third sacrificial layer 53 is formed so as to cover the recessed lens group 510. The third sacrificial layer 53 is formed by a vapor deposition method such as a CVD method, for example. The third sacrificial layer 53 contains silicon, for example. The third sacrificial layer 53 may be formed of the same material as that of the first sacrificial layer 51.

Figure 15:
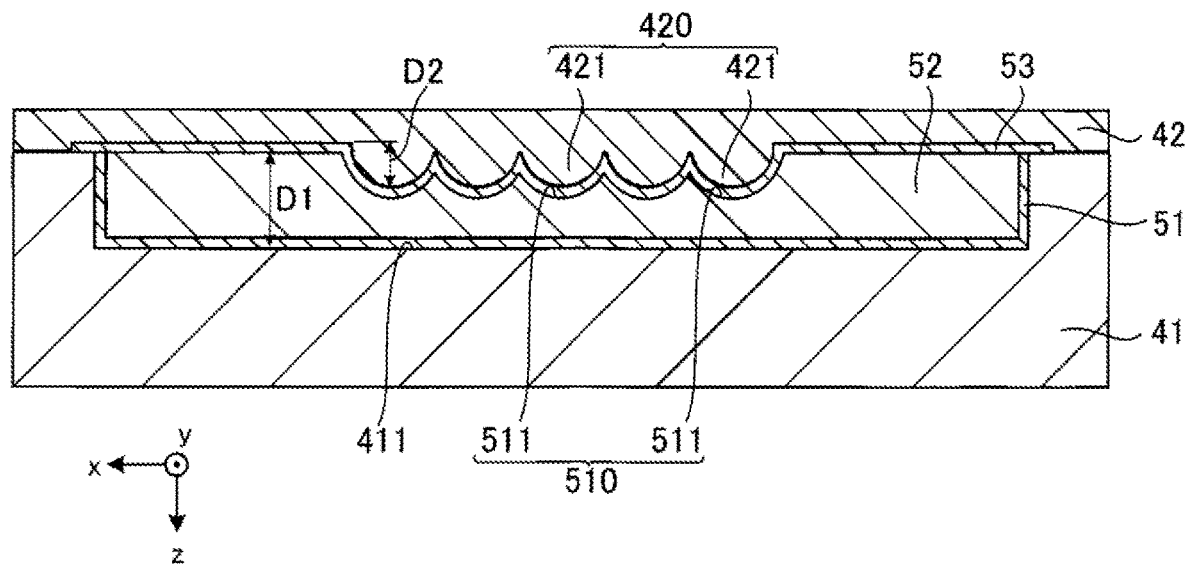
FIG. 15 is a cross-sectional view illustrating a lens layer formation step according to the first exemplary embodiment.
Figure 16:
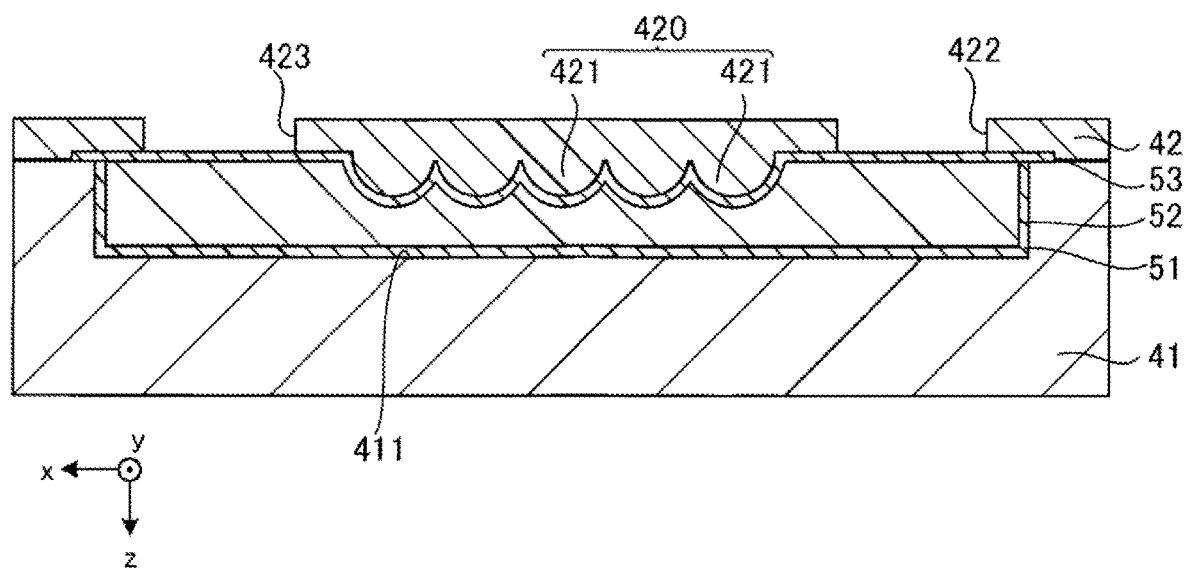
FIG. 16 is a cross-sectional view illustrating the lens layer formation step according to the first exemplary embodiment.

FIGS. 15 and 16 are each a cross-sectional view illustrating the lens layer formation step S13 according to the first exemplary embodiment. In the lens layer formation step S13, first, as illustrated in FIG. 15, the lens layer 42 including the lens assembly 420 including the plurality of lenses 421 is formed on the third sacrificial layer 53. The lens layer 42 contains silicon oxide and the like, for example. The lens layer 42 is formed by a vapor deposition method such as a CVD method, for example. Next, as illustrated in FIG. 16, the first hole 422 and the second hole 423 are formed in the lens layer 42. The formation of each of the first hole 422 and the second hole 423 is performed by etching, for example.

Figure 17:
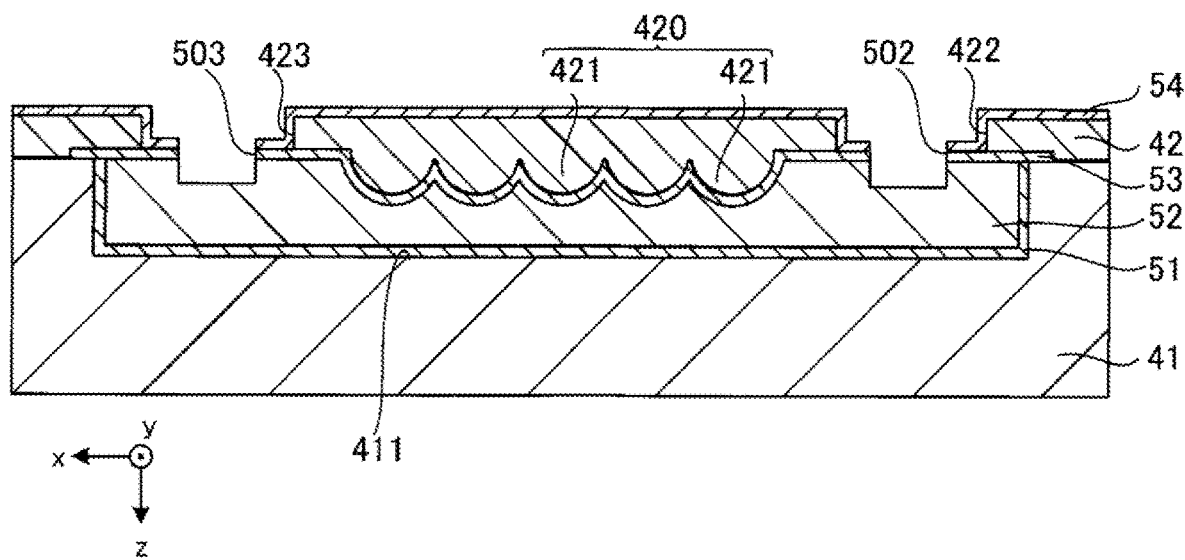
FIG. 17 is a cross-sectional view illustrating a space formation step according to the first exemplary embodiment.
Figure 18:
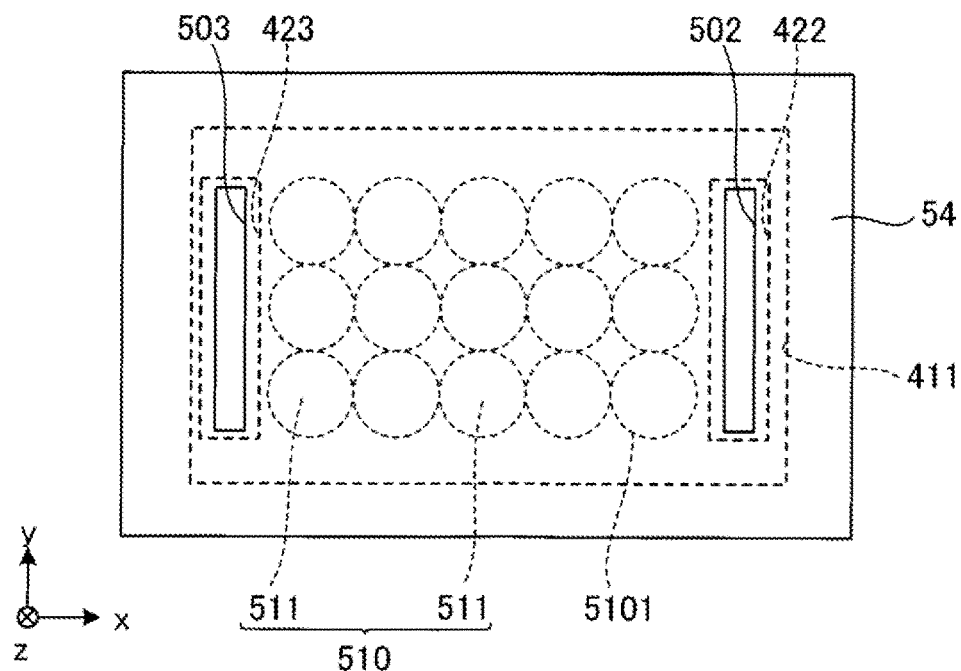
FIG. 18 is a plan view illustrating the space formation step according to the first exemplary embodiment.
Figure 19:
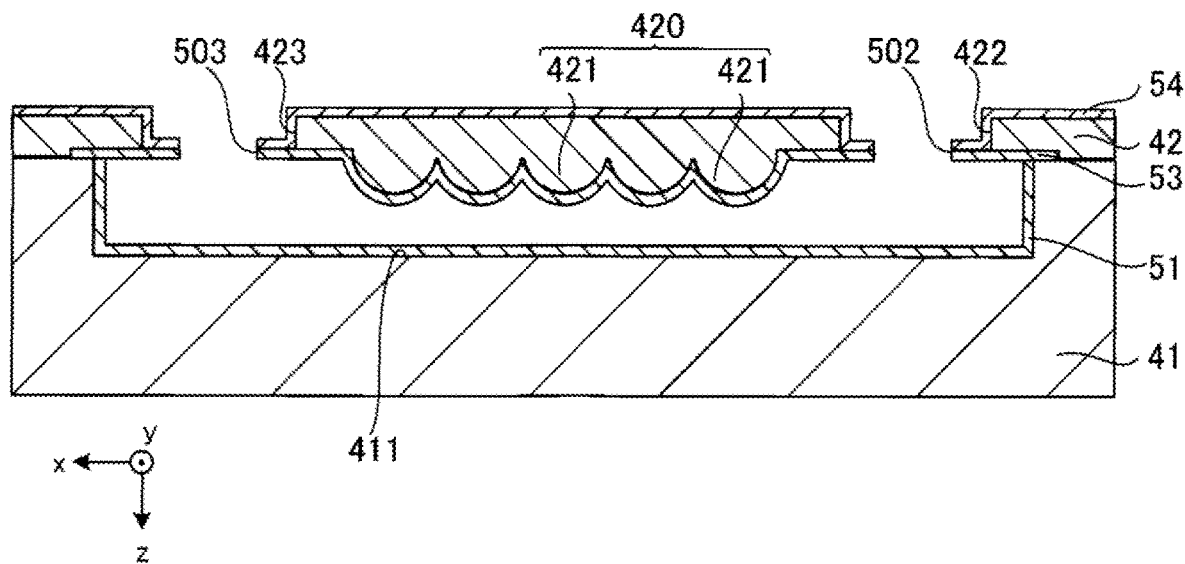
FIG. 19 is a cross-sectional view illustrating the space formation step according to the first exemplary embodiment.
Figure 20:
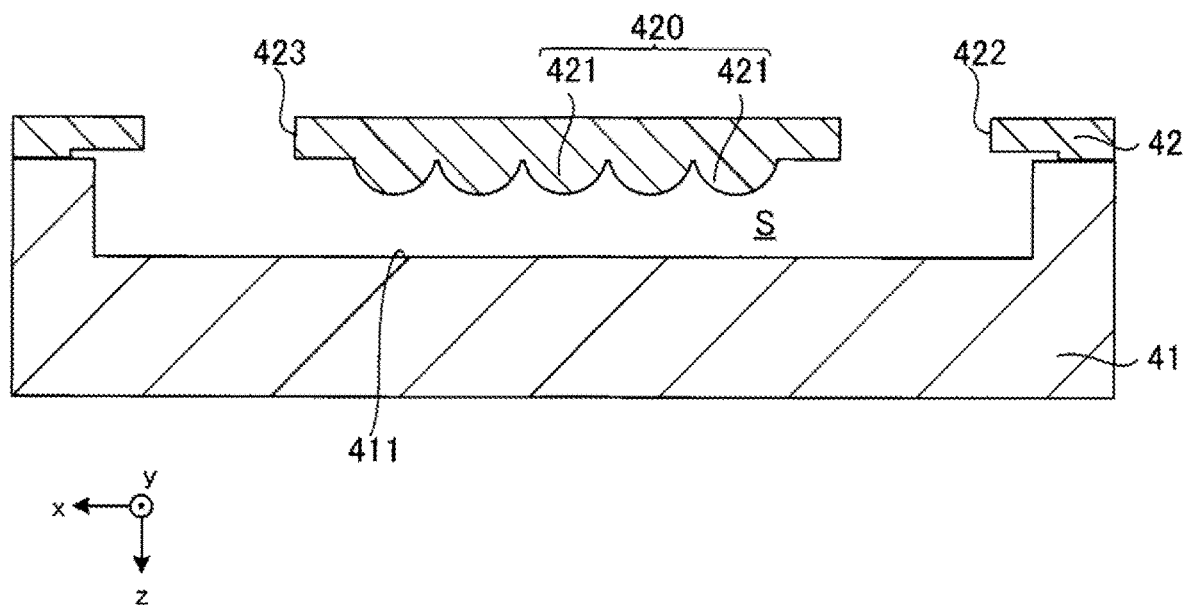
FIG. 20 is a cross-sectional view illustrating the space formation step according to the first exemplary embodiment.

FIGS. 17, 19, and 20 are each a cross-sectional view illustrating the space formation step S14 according to the first exemplary embodiment. FIG. 18 is a plan view illustrating the space formation step S14 according to the first exemplary embodiment. In the space formation step S14, first, as illustrated in FIG. 17, a fourth sacrificial layer 54 is formed on the lens layer 42. Subsequently, a first space hole 502 and a second space hole 503 are formed. The fourth sacrificial layer 54 is formed by a vapor deposition method such as a CVD method, for example. The fourth sacrificial layer 54 contains silicon, for example. The fourth sacrificial layer 54 may be formed of the same material as that of the third sacrificial layer 53.

The first space hole 502 and the second space hole 503 are each acquired by removing a part of the fourth sacrificial layer 54 and a part of the third sacrificial layer 53. Note that, in the illustration, a part of the second sacrificial layer 52 is also removed during the removal. By setting the constituent material of the fourth sacrificial layer 54 to be the same as the constituent material of the third sacrificial layer 53, the fourth sacrificial layer 54 and the third sacrificial layer 53 can be removed collectively. Further, as illustrated in FIG. 18, the first space hole 502 is encompassed in the first hole 422 in plan view. In other words, the first space hole 502 overlaps the first hole 422 in plan view, and a planar area of the first space hole 502 is larger than a planar area of the first hole 422. Similarly, the second space hole 503 is encompassed in the second hole 423 in plan view. In other words, the second space hole 503 overlaps the second hole 423 in plan view, and a planar area of the second space hole 503 is larger than a planar area of the second hole 423.

Next, as illustrated in FIG. 19, the second sacrificial layer 52 is removed by etching by using the first hole 422, the second hole 423, the first space hole 502, and the second space hole 503. In order to remove the second sacrificial layer 52, processing by gas and the like having a high selection ratio to the first sacrificial layer 51 and the third sacrificial layer 53, which will be described later, is beneficial. For example, when the second sacrificial layer 52 is formed of silicon oxide, gas etching using a fluorine-based etching gas such as hydrogen fluoride (HF) or wet etching using a fluorine-based etchant such as hydrogen fluoride (HF) may be used. Further, during the etching, the first sacrificial layer 51, the third sacrificial layer 53, and the fourth sacrificial layer 54 function as a protective layer for protecting the second base 41 and the lens layer 42. In order to suitably exhibit the function as the protective layer, a constituent material of each of the first sacrificial layer 51, the third sacrificial layer 53, and the fourth sacrificial layer 54 may be different from a constituent material of the second sacrificial layer 52. Particularly, an etching rate of the first sacrificial layer 51 for the etching gas used for removing the second sacrificial layer 52 may be slower than an etching rate of the second sacrificial layer 52 for the etching gas. The same also applies to the third sacrificial layer 53 and the fourth sacrificial layer 54.

Next, as illustrated in FIG. 20, the first sacrificial layer 51, the third sacrificial layer 53, and the fourth sacrificial layer 54 are removed by etching by using the first hole 422 and the second hole 423. As a result, the space S is formed between the lens assembly 420 and the second base 41. For example, when the second sacrificial layer 52 is formed of silicon, dry etching using a fluorine gas such as sulfur hexafluoride ($SF_6$), wet etching using hydrofluoric acid or the like, or gas etching using a fluorine-based gas such as chlorine trifluoride ($ClF_3$) may be used. Further, by setting a constituent material of the first sacrificial layer 51, a constituent material of the third sacrificial layer 53, and a constituent material of the fourth sacrificial layer 54 to be the same, the fourth sacrificial layer 54 and the third sacrificial layer 53 can be removed collectively. Note that the gas etching is etching by simply supplying gas. Further, the dry etching includes plasma etching, ion beam etching, and the like, and does not include gas etching.

Figure 21:
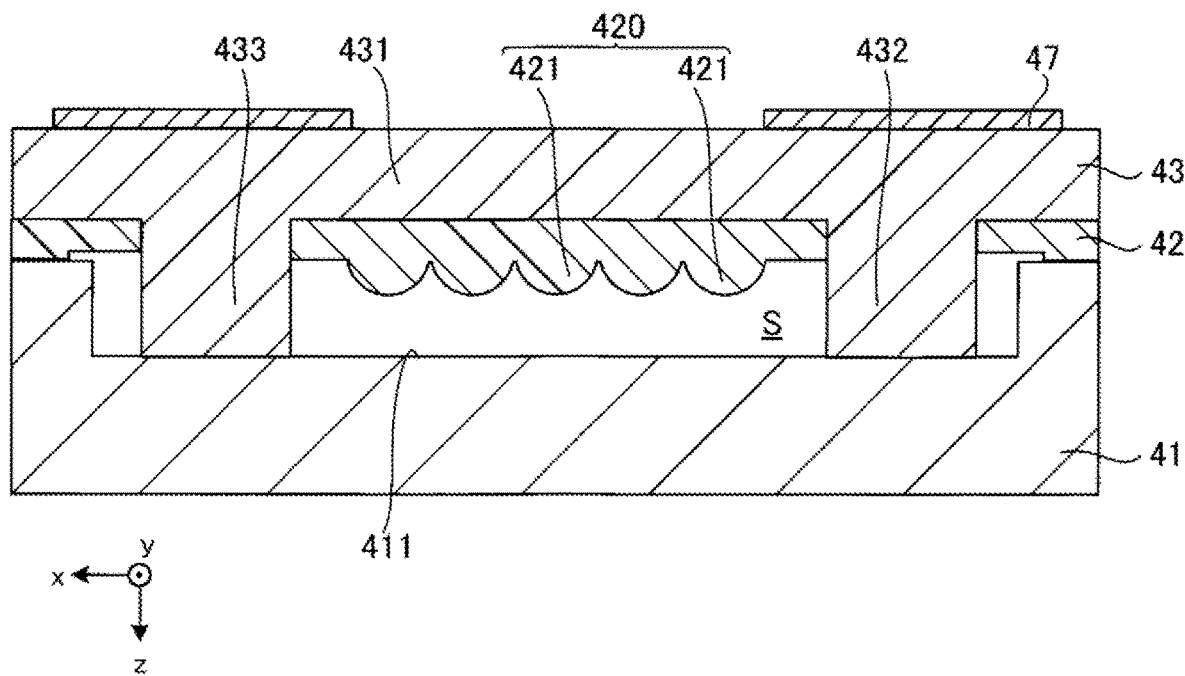
FIG. 21 is a cross-sectional view illustrating a first translucent layer formation step and a light shielding film formation step according to the first exemplary embodiment.

FIG. 21 is a cross-sectional view illustrating the first translucent layer formation step S15 and the light shielding film formation step S16 according to the first exemplary embodiment. In the first translucent layer formation step S15, the first translucent layer 43 is formed on the lens layer 42. The first translucent layer 43 is formed by forming a translucent film containing, for example, silicon oxide and the like by a vapor deposition method such as a CVD method, for example, and by performing planarization processing on the translucent film by polishing processing such as a CMP method. When the first translucent layer 43 is formed, the first connection portion 432 is also formed, and the second connection portion 433 is formed. The first connection portion 432 contacts the second base 41 through the first hole 422. The second connection portion 433 contacts the second base 41 through the second hole 423.

Next, in the light shielding film formation step S16, the light shielding film 47 is formed on the first translucent layer 43. The light shielding film 47 is formed so as to surround the lens assembly 420 in plan view. The light shielding film 47 is formed by forming a layer containing a metal or a metal compound, for example, by a vapor deposition method such as a CVD method, and then patterning the layer by using a mask.

Next, in the second translucent layer formation step S17, although not illustrated, the second translucent layer 44 that covers the light shielding film 47 is formed on the first translucent layer 43. The second translucent layer 44 contains silicon oxide, for example. The second translucent layer 44 is formed by forming a translucent film by a vapor deposition method such as a CVD method, for example, and by performing planarization processing on the translucent film by polishing processing such as a CMP method.

Next, in the counter electrode formation step S18, although not illustrated, the counter electrode 45 is formed on the second translucent layer 44. The counter electrode 45 contains a metal or a metal compound, for example. The counter electrode 45 is formed by a vapor deposition method such as a CVD method, for example.

Next, in the second alignment film formation step S19, the second alignment film 46 is formed by forming a layer formed of, for example, polyimide by a vapor deposition method such as a CVD method and then performing rubbing treatment on the layer. As described above, the counter substrate 4 illustrated in FIG. 5 is formed.

As described above, the method for manufacturing the counter substrate 4 includes the second base formation step S11, the lens layer formation step S13, and the first translucent layer formation step S15. In the second base formation step S11, the second base 41 having translucency is formed. In the lens layer formation step S13, the lens layer 42 including the lens assembly 420 including the plurality of lenses 421 is formed on the second base 41. In the first translucent layer formation step S15, the first translucent layer 43 having translucency is formed on the lens layer 42. Further, in the lens layer formation step S13, the first hole 422 that penetrates the lens layer 42 in the thickness direction is formed. In the present exemplary embodiment, the second hole 423 is formed along with the first hole 422. Further, the method for manufacturing the counter substrate 4 includes the space formation step S14 after the lens layer formation step S13 and before the first translucent layer formation step S15. In the space formation step S14, the space S is formed between the lens assembly 420 and the second base 41 by etching using the first hole 422 and the second hole 423. In the first translucent layer formation step S15, the first hole 422 and the second hole 423 are filled and are covered by the first translucent layer 43.

According to such a manufacturing method, the counter substrate 4 having excellent lens performance can be formed efficiently and with high precision. Furthermore, although not illustrated, the plurality of counter substrates 4 can be formed efficiently and with high precision by forming a mother substrate for forming the plurality of counter substrates 4 and then segmenting the mother substrate.

Figure 22:
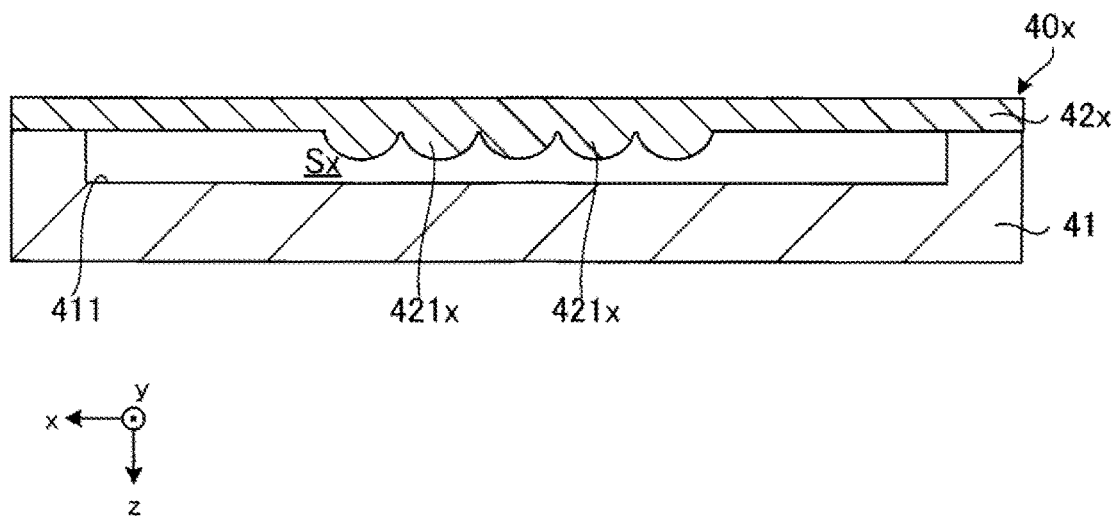
FIG. 22 is a cross-sectional view illustrating a structure including a lens layer without a first hole and a second hole.

FIG. 22 is a cross-sectional view illustrating a structure 40x including a lens layer 42x without including the first hole 422 and the second hole 423. As illustrated in FIG. 22, it is conceivable that, with the structure 40x formed of the second base 41 and the lens layer 42x, a space Sx can be provided between a plurality of lenses 421x and the second base 41 without using the first translucent layer 43 described above. The structure 40x is formed by, for example, bonding the lens layer 42x to the second base 41 with an adhesive. However, there is a risk that a thickness of the adhesive may vary, and the lens layer 42x may be more likely to be separated from the second base 41 and the like. Particularly, when the plurality of structures 40x are formed by segmenting the mother substrate, there is a risk that the lens layer 42x may be separated from the second base 41 and the like during the segmentation. Therefore, with such a method, it is difficult to form the structure 40x having excellent lens performance efficiently and with high precision.

In contrast, in the manufacturing method according to the present exemplary embodiment, after the lens layer 42 is formed on the second base 41, the space S is formed by etching using the first hole 422 and the second hole 423. Subsequently, the first hole 422 and the second hole 423 are filled and are covered by the first translucent layer 43. As a result, the processing of bonding the lens layer 42 to the second base 41 with an adhesive can be omitted. Accordingly, it is possible to prevent a variation in adhesion between the second base 41 and the lens layer 42. Thus, the risk of separation or the like of the lens layer 42 from the second base 41 can be prevented or suppressed. Therefore, the manufacturing method of the present exemplary embodiment can form the counter substrate 4 having excellent lens performance efficiently and with high precision.

As described above, the first translucent layer 43 includes the first connection portion 432 as a "connection portion" coupled to the second base 41 through the first hole 422. Similarly, in the present exemplary embodiment, the first translucent layer 43 includes the second connection portion 433 coupled to the second base 41 through the second hole 423. By providing the first translucent layer 43 with the first connection portion 432 and the second connection portion 433, bending of the lens layer 42 can be suppressed during manufacturing of the second translucent layer 44 and the like as compared with when the first translucent layer 43 is formed of only the translucent base portion 431.

As described above, the lens layer 42 is provided with the first hole 422 and the second hole 423. Etching efficiency can be increased by further providing the second hole 423 in addition to the first hole 422. Thus, the space formation step S14 can be performed more quickly.

Furthermore, as described above, the lens assembly 420 is disposed between the first hole 422 and the second hole 423 in plan view when viewed from the thickness direction of the lens layer 42. In other words, the first hole 422 and the second hole 423 are disposed on both sides of the lens assembly 420 in plan view. With such arrangement, etching efficiency can be increased as compared with when the first hole 422 and the second hole 423 are disposed on only one side of the lens assembly 420, for example, on only the +z axis side in plan view.

As described above, the outer shape 4201 of the lens assembly 420 in plan view is a longitudinal shape. Particularly, in the present exemplary embodiment, the outer shape 4201 of the lens assembly 420 in plan view has a substantially rectangular shape. The first hole 422 and the second hole 423 are each disposed along a direction orthogonal to the longitudinal direction of the outer shape 4201. The direction orthogonal to the longitudinal direction of the outer shape 4201 is the y direction in the illustration. By forming each of the first hole 422 and the second hole 423 along the y direction, strength of the lens layer 42 can be increased as compared with when the first hole 422 and the second hole 423 are formed along the x direction. Particularly, the strength of the lens layer 42 can be increased before the first hole 422 is filled and is covered by the first connection portion 432. Thus, particularly, in a step before the lens layer formation step S13, bending that may occur in the lens layer 42 is suppressed. Accordingly, dimensional accuracy of each of the lens layer 42 and the first translucent layer 43 can be increased.

Note that, in the present exemplary embodiment, the lens assembly 420 is disposed between the first hole 422 and the second hole 423 in plan view, but the arrangement of the first hole 422 and the second hole 423 is not limited to this, and any arrangement may be used. For example, the first hole 422 and the second hole 423 may be disposed on only one side of the outer shape 4201 having a substantially rectangular shape in plan view. Further, for example, the first hole 422 may be disposed along a long side of the outer shape 4201, and the second hole 423 may be disposed along a short side of the outer shape 4201. Further, in the present exemplary embodiment, the outer shape 4201 of the lens assembly 420 in plan view has a longitudinal shape, which is not limited thereto, and the outer shape 4201 may have any shape. For example, the outer shape 4201 in plan view may be a circular shape, a polygonal shape other than a rectangular shape, or the like.

1-2. Second Exemplary Embodiment

Figure 23:
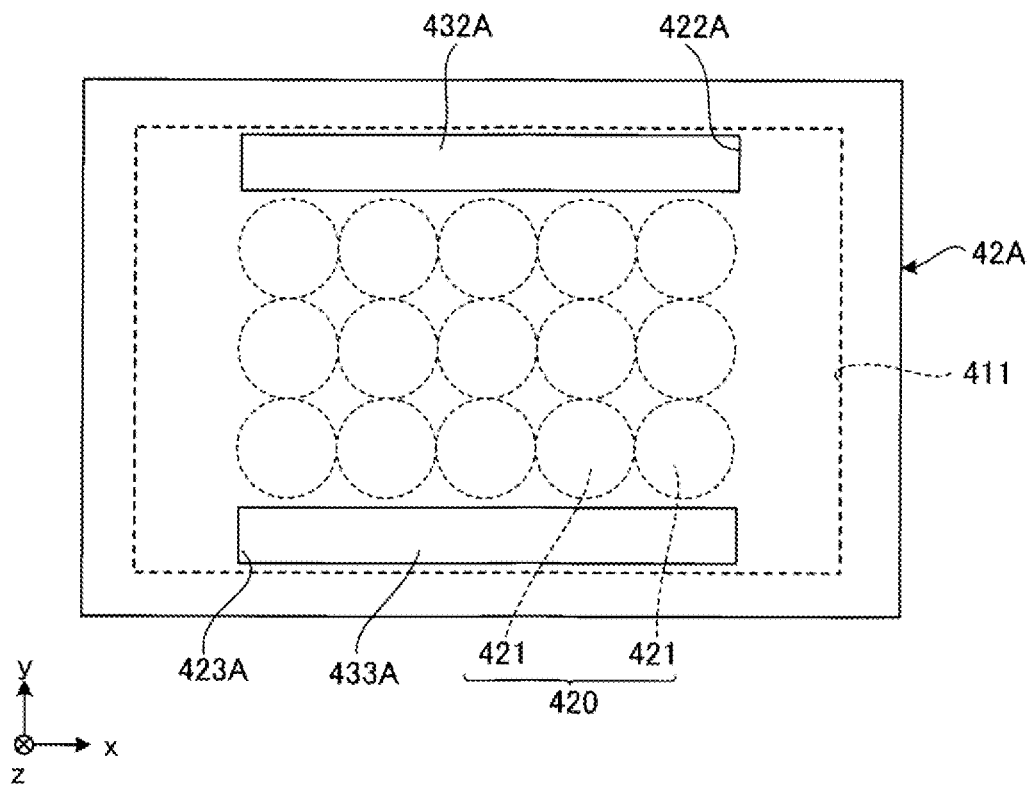
FIG. 23 is a diagram illustrating a lens layer according to a second exemplary embodiment.

Next, a second exemplary embodiment of the present disclosure will be described. FIG. 23 is a diagram illustrating a lens layer 42A according to the second exemplary embodiment. The present exemplary embodiment is different from the first exemplary embodiment mainly in a configuration of the lens layer 42A. Note that, in the second exemplary embodiment, a sign used in the description of the first exemplary embodiment is used for the same matter as that of the first exemplary embodiment, and each detailed description thereof will be appropriately omitted.

As illustrated in FIG. 23, a first hole 422A and a second hole 423A are provided in the lens layer 42A. The first hole 422A and the second hole 423A are each disposed along a longitudinal direction of an outer shape 4201. In the illustration, the longitudinal direction of the outer shape 4201 is the x direction. When the first hole 422A and the second hole 423A are disposed along the x direction, a planar area of the first hole 422A and a planar area of the second hole 423A are more easily increased than when the first hole 422A and the second hole 423A are disposed along the y direction. As a result, etching efficiency can be increased, and thus a space formation step S14 can be performed more quickly. Etching efficiency can be further increased by further providing the second hole 423A in addition to the first hole 422A.

A first translucent layer 43A includes a first connection portion 432A and a second connection portion 433A. The first connection portion 432A is disposed in the first hole 422A. Similarly, the second connection portion 433A is disposed in the second hole 423A. Note that, in the illustration, a planar area of the first hole 422A and a planar area of the second hole 423A are substantially equal, but may be different from each other.

1-3. Third Exemplary Embodiment

Figure 24:
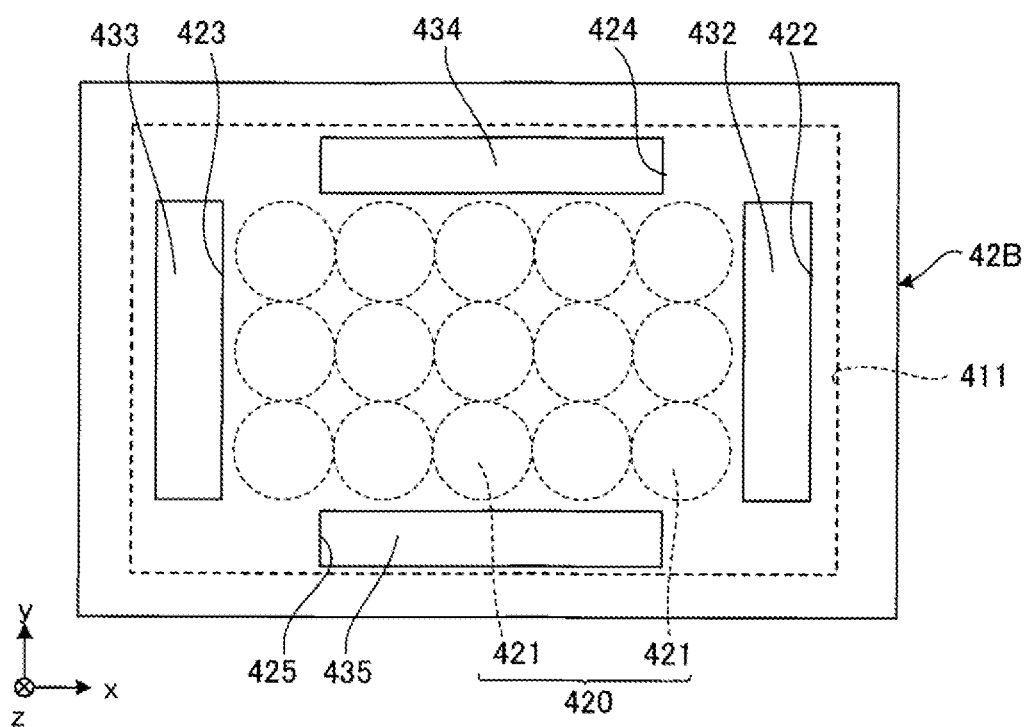
FIG. 24 is a diagram illustrating a lens layer according to a third exemplary embodiment.

Next, a third exemplary embodiment of the present disclosure will be described. FIG. 24 is a diagram illustrating a lens layer 42B according to the third exemplary embodiment. The present exemplary embodiment is different from the first exemplary embodiment mainly in a configuration of the lens layer 42B. Note that, in the third exemplary embodiment, a sign used in the description of the first exemplary embodiment is used for the same matter as that of the first exemplary embodiment, and each detailed description thereof will be appropriately omitted.

As illustrated in FIG. 24, the lens layer 42B is provided with a third hole 424 as a "third through hole" that penetrates in a thickness direction, and a fourth hole 425 as a "fourth through hole" that penetrates in the thickness direction. A lens assembly 420 is disposed between the third hole 424 and the fourth hole 425 in plan view. The third hole 424 and the fourth hole 425 are disposed along a longitudinal direction of the lens assembly 420. Thus, a first hole 422, a second hole 423, the third hole 424, and the fourth hole 425 are disposed corresponding to four sides of the lens layer 42B having a substantially rectangular shape in plan view. By providing the lens layer 42B with the first hole 422, the second hole 423, the third hole 424, and the fourth hole 425, etching efficiency can be increased as compared with when the third hole 424 and the fourth hole 425 are not provided. Thus, a space formation step S14 can be performed more quickly.

A first translucent layer 43B includes a third connection portion 434 and a fourth connection portion 435. The third connection portion 434 is disposed in the third hole 424. Similarly, the fourth connection portion 435 is disposed in the fourth hole 425.

4. Fourth Exemplary Embodiment

Figure 25:
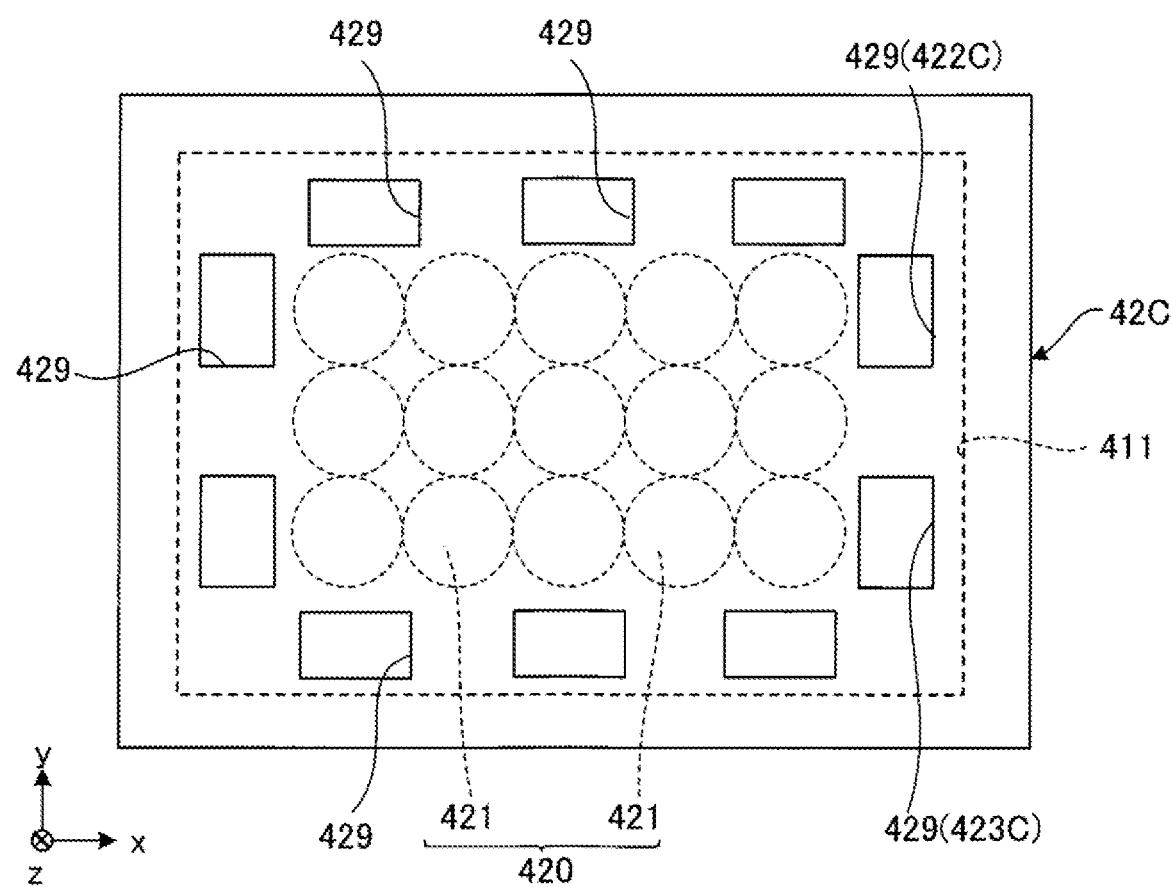
FIG. 25 is a diagram illustrating a lens layer according to a fourth exemplary embodiment.

Next, a fourth exemplary embodiment of the present disclosure will be described. FIG. 25 is a diagram illustrating a lens layer 42C according to the fourth exemplary embodiment. The present exemplary embodiment is different from the first exemplary embodiment mainly in a configuration of the lens layer 42C. Note that, in the fourth exemplary embodiment, a sign used in the description of the first exemplary embodiment is used for the same matter as that of the first exemplary embodiment, and each detailed description thereof will be appropriately omitted.

As illustrated in FIG. 25, a plurality of holes 429 including a first hole 422C and a second hole 423C are provided in the lens layer 42C. Specifically, two or more holes 429 arranged side by side along the y direction and two or more holes 429 arranged side by side along the x direction are provided in the lens layer 42C. Further, the plurality of holes 429 include the first hole 422C as a "through hole", and a second hole 423C aligned with the first hole 422C along a direction orthogonal to a longitudinal direction of an outer shape 4201 of a lens assembly 420 in plan view. Note that the first hole 422C and the second hole 423C may be disposed side by side along the longitudinal direction of the outer shape 4201. Further, the first hole 422C is any one hole 429 of the plurality of holes 429. The lens layer 42B provided with the plurality of holes 429 as in the present exemplary embodiment can also efficiently form a space S by etching.

1-5. Modification Examples

Each of the exemplary embodiments exemplified in the above can be variously modified. Specific modification aspects applied to each of the exemplary embodiments described above are exemplified below. Two or more modes freely selected from exemplifications below can be appropriately used in combination as long as mutual contradiction does not arise.

1-5a. First Modification Example

In each of the exemplary embodiments described above, the lens 421 is formed of a convex lens having a convex curved surface, but the lens 421 may be a concave lens having a concave curved surface.

1-5b. Second Modification Example

In each of the exemplary embodiments described above, one lens 421 overlaps one pixel electrode 28 in plan view, but the plurality of lenses 421 may overlap one pixel electrode 28 in plan view. For example, four lenses 421 may overlap one pixel electrode 28 in plan view.

1-5c. Third Modification Example

In each of the exemplary embodiments described above, the second base 41 includes the recessed portion 411, but the second base 41 may not include the recessed portion 411. For example, a recessed portion may be provided on the surface of the lens layer 42 on the +z axis side. In that case, for example, the lens assembly 420 can be provided on a bottom surface of the recessed portion.

1-5d. Fourth Modification Example

Any element may be disposed between the second base 41 and the lens layer 42. However, the second base 41 and the lens layer 42 may have portions being in contact with each other as illustrated in FIG. 5. Similarly, any element may be disposed between the lens layer 42 and the first translucent layer 43. However, the lens layer 42 and the first translucent layer 43 may be in contact with each other as illustrated in FIG. 5.

1-5e. Fifth Modification Example

In each of the exemplary embodiments described above, the "switching element" is the TFT 260, which is not limited thereto. The "switching element" may be, for example, a metal-oxide-semiconductor field-effect transistor (MOSFET) and the like.

1-5f. Sixth Modification Example

In each of the exemplary embodiments described above, the light LL is incident from the counter substrate 4, but the light LL may be incident from the element substrate 2.

2. Electronic Apparatus

The electro-optical device 100 can be used for various electronic apparatuses.

Figure 26:
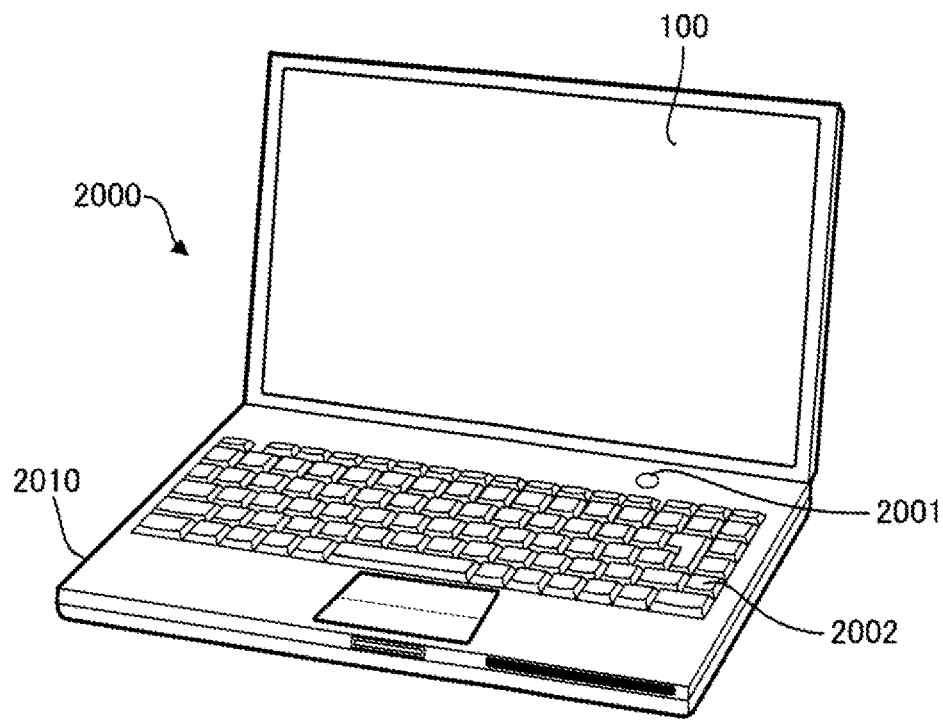
FIG. 26 is a perspective view illustrating a personal computer as an example of an electronic apparatus.

FIG. 26 is a perspective view illustrating a personal computer 2000 as an example of an electronic apparatus. The personal computer 2000 includes the electro-optical device 100 that displays various images, and a main body portion 2010 in which a power source switch 2001 and a keyboard 2002 are installed.

Figure 27:
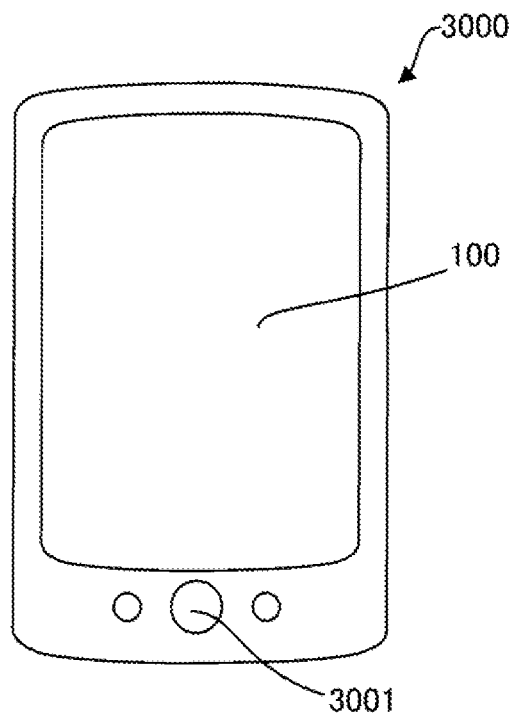
FIG. 27 is a perspective view illustrating a smartphone as an example of an electronic apparatus.

FIG. 27 is a perspective view illustrating a smartphone 3000 as an example of an electronic apparatus. The smartphone 3000 includes an operation button 3001 and the electro-optical device 100 that displays various images. A screen content displayed on the electro-optical device 100 is changed in accordance with an operation of the operation button 3001.

Figure 28:
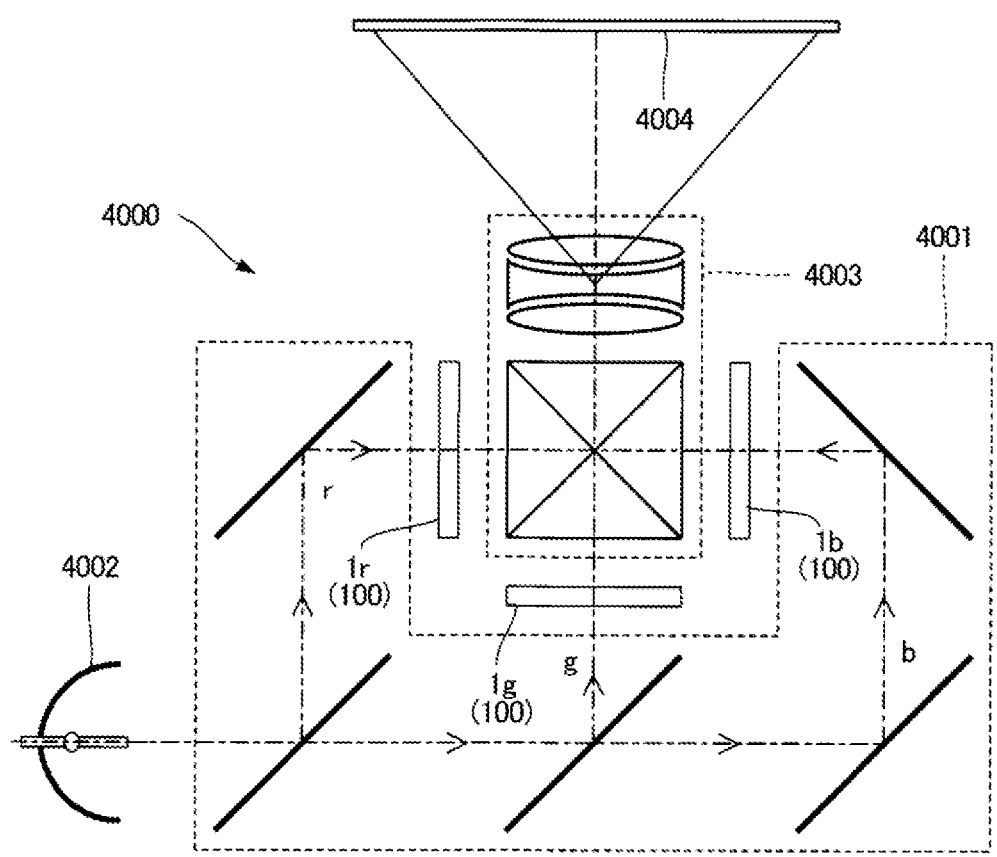
FIG. 28 is a schematic diagram illustrating a projector as example of an electronic apparatus.

FIG. 28 is a schematic diagram illustrating a projector as an example of an electronic apparatus. A projection-type display device 4000 is a three-plate type projector, for example. An electro-optical device 1r is an electro-optical device 100 corresponding to a red display color, an electro-optical device 1g is an electro-optical device 100 corresponding to a green display color, and an electro-optical device 1b is an electro-optical device 100 corresponding to a blue display color. Specifically, the projection-type display device 4000 includes the three electro-optical devices 1r, 1g, and 1b that respectively correspond to display colors of red, green, and blue.

An illumination optical system 4001 supplies a red element r of light emitted from an illumination device 4002 as a light source to the electro-optical device 1r, a green element g of the light to the electro-optical device 1g, and a blue element b of the light to the electro-optical device 1b. Each of the electro-optical devices 1r, 1g, and 1b functions as an optical modulator, such as a light bulb, that modulates respective rays of the monochromatic light supplied from the illumination optical system 4001 depending on display images. A projection optical system 4003 combines the rays of the light emitted from each of the electro-optical devices 1r, 1g, and 1b to project the combined light to a projection surface 4004.

Each of the personal computer 2000, the smartphone 3000, and the projection-type display device 4000, which are described above, includes the electro-optical device 100 including the counter substrate 4 described above. The electro-optical device 100 is provided, and thus the quality of each display in the personal computer 2000, the smartphone 3000, and the projection-type display device 4000 can be increased.

The present disclosure has been described above based on the preferred exemplary embodiments, but the present disclosure is not limited to each of the exemplary embodiments described above. In addition, the configuration of each component of the present disclosure may be replaced with any configuration that exerts the equivalent functions of the above-described exemplary embodiments, and to which any configuration may be added.

Note that an electronic apparatus to which the optical substrate of the present disclosure is applied is not limited to the exemplified apparatus. Examples of the electronic apparatus include a personal digital assistant (PDA), a digital still camera, a television, a video camera, a car navigation device, a display device for in-vehicle use, an electronic organizer, electronic paper, an electronic calculator, a word processor, a workstation, a visual telephone, a point of sale (POS) terminal, and the like. Other examples of the electronic apparatus to which the present disclosure is applied further include an apparatus including a printer, a scanner, a copier, a video player, or a touch panel.

In the description described above, the liquid crystal display device has been described as an example of the electro-optical device, but the electro-optical device is not limited thereto. For example, the electro-optical device can also be applied to an image sensor and the like. For example, the present disclosure can also be applied to a display panel using light-emitting devices such as organic electro luminescence (EL) devices, inorganic EL devices, and light-emitting polymers, similarly to the exemplary embodiments described above. Furthermore, the present disclosure can also be applied to an electrophoretic display panel that uses micro capsules each including colored liquid and white particles distributed in the liquid, similarly to the exemplary embodiments described above.

What is claimed is:

1. An optical substrate, comprising:
   a base having translucency and including a recessed portion;
   a translucent layer having translucency; and
   a lens layer that is disposed between the recessed portion of the base and the translucent layer and includes a lens assembly including a plurality of lenses, wherein
   the lens assembly and the recessed portion of the base are disposed with a space therebetween,
   the lens layer includes a through hole that is disposed through the lens layer in a thickness direction, and
   the translucent layer is disposed over the through hole and includes a connection portion that is in contact with a bottom surface of the recessed portion through the through hole.

2. The optical substrate according to claim 1, wherein the translucent layer includes a connection portion coupled to the base through the through hole.

3. The optical substrate according to claim 1, wherein the lens layer includes a second through hole that extends through the lens layer in a thickness direction.

4. The optical substrate according to claim 3, wherein the lens assembly is disposed between the through hole and the second through hole in plan view when viewed from a thickness direction of the lens layer.

5. The optical substrate according to claim 4, wherein the lens assembly has a shape extending in a longitudinal direction in the plan view, and
   the lens layer includes the through hole and the second through hole disposed along the longitudinal direction of the outer shape.

6. The optical substrate according to claim 4, wherein the lens assembly has a shape extending in a longitudinal direction in the plan view, and
   the lens layer includes the through hole and the second through hole disposed along the direction orthogonal to a longitudinal direction of the outer shape.

7. The optical substrate according to claim 6, wherein the lens layer includes a third through hole that extends through the lens layer in the thickness direction, and a fourth through hole that extends through the lens layer in the thickness direction,
   the lens assembly is disposed between the third through hole and the fourth through hole in the plan view, and
   the lens layer includes the third through hole and the fourth through hole disposed along the longitudinal direction.

8. The optical substrate according to claim 4, wherein the lens assembly has a longitudinal outer shape in the plan view, and
   the lens layer includes the through hole and the second through hole disposed along a longitudinal direction of the outer shape or a direction orthogonal to the longitudinal direction.

9. The optical substrate according to claim 1, further comprising
   a light shielding film that does not overlap the lens assembly in plan view when viewed from a thickness direction of the lens layer.

10. The optical substrate according to claim 1, further comprising:
    an electrode that is disposed on an opposite side from the lens layer with respect to the translucent layer and has translucency; and
    a second translucent layer that is disposed between the electrode and the translucent layer and has translucency.

11. An electronic apparatus, comprising:
    the optical substrate according to claim 1.

12. A method for manufacturing an optical substrate, comprising:
    forming a base having translucency;
    forming, on the base, a lens layer including a lens assembly including a plurality of lenses; and
    forming, on the lens layer, a translucent layer having translucency, wherein
    a through hole that extends through the lens layer in a thickness direction is formed during the formation of the lens layer,
    a space is formed between the lens assembly and the base by etching using the through hole after the formation of the lens layer and before the formation of the translucent layer, and the through hole is filled by the translucent layer during the formation of the translucent layer.

* * * * *